United States Patent
Sano et al.

(10) Patent No.: US 6,385,009 B2
(45) Date of Patent: *May 7, 2002

(54) THIN FILM MAGNETIC HEAD AND ASSEMBLED CONSTRUCTION THEREOF

(75) Inventors: Masaaki Sano, Hitachi; Yoshiaki Kita, Hitachinaka; Shun-ichi Narumi, Hitachi; Takashi Kawabe, Odawara; Moriaki Fuyama, Hitachi; Hisashi Takano, Kodaira; Hisano Yamamoto, Hachiouji; Kenzo Masuda, Odawara, all of (JP)

(73) Assignee: Hitachi, Ltd., Toyko (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/899,215

(22) Filed: Jul. 6, 2001

Related U.S. Application Data

(63) Continuation of application No. 09/626,743, filed on Jul. 26, 2000, now Pat. No. 6,262,867, which is a continuation of application No. 08/594,275, filed on Jan. 30, 1996, now Pat. No. 6,118,628.

(30) Foreign Application Priority Data

Feb. 3, 1995 (JP) .................................................. 7-16666

(51) Int. Cl.[7] .................................................. G11B 5/31
(52) U.S. Cl. ...................................................... 360/126
(58) Field of Search .................................. 360/125, 126

(56) References Cited

U.S. PATENT DOCUMENTS

| | | |
|---|---|---|
| 3,676,610 A | 7/1972 | Moss et al. |
| 4,589,042 A | 5/1986 | Anderson et al. |
| 4,706,145 A | 11/1987 | Hirabayashi et al. |
| 4,780,781 A | 10/1988 | Sano et al. |
| 5,117,321 A | 5/1992 | Nakanishi et al. |
| 5,126,907 A | 6/1992 | Hamakawa et al. |
| 5,276,574 A | 1/1994 | Abe et al. |
| 5,606,478 A | 2/1997 | Chen et al. |
| 6,118,628 A | 9/2000 | Sano et al. |
| 6,262,867 B1 * | 7/2001 | Sano et al. ................. 360/126 |

FOREIGN PATENT DOCUMENTS

| | | |
|---|---|---|
| JP | 60-82638 | 5/1985 |
| JP | 61-76642 | 4/1986 |
| JP | 64-8605 | 1/1989 |
| JP | 2-68906 | 3/1990 |
| JP | 2-290995 | 11/1990 |

* cited by examiner

Primary Examiner—Craig A. Renner
(74) Attorney, Agent, or Firm—Antonelli, Terry, Stout & Kraus, LLP

(57) ABSTRACT

A thin film magnetic head having a first magnetic core, a second magnetic core formed on the first magnetic core, a coil disposed between the first magnetic core and second magnetic core, and a non-magnetic insulator body for separating the first magnetic core, second magnetic core and coil with respect to each other. At least one of the first magnetic core and the second magnetic core includes an electroplated thin film with an average crystal grain size smaller than 500 Å and the electroplated thin film is made of Ni—Fe alloy of which Ni is 38 to 60 wt % and Fe is 40 to 62 wt %.

5 Claims, 13 Drawing Sheets

THIN FILM MAGNETIC HEAD AND ASSEMBLED CONSTRUCTION THEREOF

CROSS REFERENCE TO RELATED APPLICATION

This is a continuation of U.S. application Ser. No. 09/626,743, filed Jul. 26, 2000, now U.S. Pat. No. 6,262,867, which is a continuation of U.S. application Ser. No. 08/594,275, filed Jan. 30, 1996, now U.S. Pat. No. 6,118,628, issued Sep. 12, 2000, the subject matter of which is incorporated by reference herein.

BACKGROUND OF THE INVENTION

The present invention relates to a disk storage system, a thin film magnetic head therefor and a fabrication method thereof.

The present invention relates to a magnetic core for a magnetic head, and more particularly to a recording head for a dual element head for a disk system having a high recording density.

In recent years, the recording density of a disk storage system has become higher and the magnetic coercive force of recording medium has increased; accordingly, there is a need for a thin film magnetic head which is capable of sufficiently recording on a recording medium having a high magnetic coercive force.

In order to realize this, it is necessary to use a material having a high saturation magnetic flux density ($B_S$) as a core material of the magnetic head. In the past, a 80Ni—Fe alloy film of 3 $\mu$m thickness has been used for the core material.

However, since the resistivity of the 80Ni—Fe alloy film is as low as 16 to 20 $\mu\Omega$·cm, the eddy current loss becomes large in the high frequency bands. Therefore, the strength of the recording magnetic field of the magnetic head in a high frequency band is decreased, and accordingly the recording frequency is limited to about 30 MHz at maximum.

As an alternative material, Co system amorphous materials and a Fe—Al—Si sendust alloy thin film are proposed. However, these materials are not in practical use as yet because the former is thermally unstable, since the material is amorphous, and the latter has a disadvantage in the fabrication process as the magnetic core material for the inductive head, since it requires a high temperature heat treatment at nearly 500° C.

In recent years, three-element group materials of Co—Ni—Fe have been proposed (Japanese Patent Application Laid-Open No. Sho 60-82,638, Japanese Patent Application Laid-Open No. Sho 61-76,642, Japanese Patent Application Laid-Open No. Sho 64-8,605, Japanese Patent Application Laid-Open No. Hei 2-68,906, Japanese Patent Application Laid-Open No. Hei 2-290,995).

Although the saturation magnetic flux density ($B_S$) of these three-element system materials is as high as 1.5 T, the resistivity is not large and the crystal grain size is not small in the 80Ni—Fe alloy; and, in addition to this, there is a disadvantage in the high frequency characteristic as in the 80Ni—Fe alloy.

On the other hand, the memory capacity of the disk storage system has been steadily growing year by year, and areal density of a 3.5-inch type disk in production now has been increased up to 350 MB/in$^2$.

In this case, the data recording frequency is nearly 27 MHz, which is near the performance limit of a magnetic head using the 80Ni—Fe alloy film or the Co—Ni—Fe alloy film.

Although there is proposed in Japanese Patent Application Laid-Open No. 3-68,744 a magnetic film for high frequency use formed by adding Nb, Ta, Cr, Mo to (40–50) Ni—Fe through a sputtering method, it is difficult to magnetically form a thick film using a sputtering method because the material has a large magnetocrystalline anisotropy.

SUMMARY OF THE INVENTION

One object of the present invention is to provide a disk storage system, a thin film magnetic head therefor and a fabrication method thereof wherein there is provided a disk storage system with a magnetic head for high density recording in a high frequency band.

Another object of the present invention is to provide a magnetic head for high density recording in a high frequency band, that is, a magnetic head which is capable of performing high speed access and has a high transfer rate.

The present invention has been developed for solving the above problems, and involves a thin film magnetic head that is mounted on a disk storage system having a high transfer rate and high recording density, in which there is a magnetic disk rotated above 4000 rpm when the disk storage system is recording or reproducing, and in which the recording frequency is not higher than 45 MHz.

It is required that the magnetic core of the write head be made of a material having a large saturation magnetic flux density ($B_S$) a small magnetic coercive force in the hard axis direction and a large resistivity.

In other words, the range of composition obtainable for a large resistivity and high saturation magnetic flux density is a range containing Ni of 38 to 60 wt % for Ni—Fe alloy.

However, when a magnetic film having a thickness of above 2 $\mu$m is usually applied to a thin film magnetic head or the like fabricated through a sputtering method, the crystal grain size of the film becomes large, the magnetic coercive force in the hard axis direction is large and the uniaxial magnetic anisotropy is hardly induced, since this composition region is in a range where magnetocrystalline anisotropy is largest.

Therefore, a plating method has been employed in order to suppress the crystal grain size to a small value, and it has been proposed to add a third element, such as Co, Mn, Cr, Pd, B, In and the like, to a base of 38 to 60 wt % Ni—Fe two-element alloy.

The results were found to be a composition range and a fabrication method of an outstanding thin film having a saturation magnetic flux density ($B_S$) larger than 1.5 T, a magnetic coercive force in the hard axis direction ($H_{CH}$) smaller than 1.0 Oe and a resistivity larger than 40 $\mu\Omega$·cm, while keeping the film thickness of 2 to 5 $\mu$m which is required for the recording magnetic field.

By using this material for a thin film magnetic head, it is possible to provide a high performance disk storage system having areal density of 500 MB/in$^2$, a recording frequency of 45 MHz and a transmission speed of above 15 MB/s.

The present invention is characterized by a disk storage system comprising a thin film magnetic disk for recording information, rotating means for the thin film magnetic disk, a thin film magnetic head for performing writing and reading of information and provided in a floating type slider, transfer means for supporting the floating type slider and for making access to the thin film magnetic disk.

The present invention is characterized by a disk storage system wherein at least one of an upper magnetic core and a lower magnetic core the write head is made of a metallic magnetic material having an average crystal grain size smaller than 500 Å, a resistivity at room temperature larger than 40 $\mu\Omega\cdot$cm and a magnetic coercive force in the hard axis direction smaller than 1.0 Oe.

The present invention is characterized by the fact that, in a disk storage system, at least one of an upper magnetic core and a lower magnetic core of the writing magnetic core of the write head is an electroplated thin film made of a Ni—Fe group alloy having Ni of 38 to 60 wt % and Fe of 40 to 62 wt %.

Further, the present invention is characterized by a disk storage system comprising a magnetic disk having a transfer rate larger than 15 mega-bytes per second, areal density of recording data larger than 500 mega-bits per square inch and a diameter smaller than 3.5 inches.

The present invention is characterized by a disk storage system wherein the magnetic disk rotates faster than 4000 rpm during recording and reproducing, the recording frequency is larger than 45 MHz, and at least an upper magnetic core of a thin film magnetic head for performing the recording is made of a Ni—Fe alloy having Ni of 38 to 60 wt % and Fe of 40 to 62 wt % and having a film thickness of 1 to 5 $\mu$m, an average crystal grain size smaller than 500 Å, a resistivity of 40 to 60 $\mu\Omega\cdot$cm and magnetic coercive force in the hard axis direction smaller than 1.0 Oe, the recording magnetomotive force of the write head being larger than 0.5 ampere-turns.

The magnetic core in a disk storage system according to the present invention contains a substance composed of at least one kind of one of Co less than 15 wt % and Mo, Cr, Pd, B, In less than 3 wt % in the total weight.

Further, the present invention is characterized by a disk storage system comprising a thin film magnetic disk for recording information, rotating means for the thin film magnetic disk, a dual element head for performing writing and reading of information with individual elements provided in a floating type slider, and transfer means for supporting the floating type slider and for making access to the thin film magnetic disk.

The present invention is characterized by a disk storage system wherein the magnetic film having the same characteristics and the same composition as those described above are used for the magnetic film of the write head.

Furthermore, the present invention is characterized by a disk storage system comprising a magnetic disk having a transfer rate larger than 15 mega-bytes per second, areal density of recording data larger than 500 mega-bits per square inch and a diameter of a magnetic disk smaller than 3.5 inches.

The present invention is characterized by a disk storage system wherein the magnetic disk rotates faster than 4000 rpm during recording and reproducing, the recording frequency being larger than 45 MHz, a dual element head for performing the recording and the reproducing with individual elements, the film having the same characteristics and the same composition as those described above and being used for at least an upper magnetic core of a write head.

The present invention is characterized by a thin film magnetic head comprising a lower magnetic film, an upper magnetic film formed on the lower magnetic film, one end contacting one end of the lower magnetic film, the other end facing the other end of the lower magnetic film through a magnetic gap, whereby the upper magnetic film forms a magnetic circuit including the magnetic gap together with the lower magnetic film, and a conductive coil forming a coil having a given number of winding turns passing between both of the magnetic films.

The present invention is characterized by a thin film magnetic head wherein at least one of the upper magnetic film and the lower magnetic film is formed through a plating method, being made of a Ni—Fe alloy having Ni of 38 to 60 wt % and Fe of 40 to 62 wt % and having a film thickness of 1 to 5 $\mu$m, an average crystal grain size smaller than 500 Å, and a magnetic coercive force in the hard axis direction smaller than 1.0 Oe.

The present invention involves a fabrication method of a thin film magnetic head comprising a lower magnetic film, an upper magnetic film formed on the lower magnetic film, one end contacting one end of the lower magnetic film, the other end facing the other end of the lower magnetic film through a magnetic gap, whereby the upper magnetic film forms a magnetic circuit including the magnetic gap together with the lower magnetic film, and a conductive coil forming a coil having a given number of winding turns passing between both of the magnetic films.

The present invention involves a fabrication method of a thin film magnetic head wherein at least one of the lower and the upper magnetic films is formed by electroplating using a Ni—Fe electroplating bath containing a metallic ion concentration of $Ni^{++}$ ions of 15 to 20 g/l and $Fe^{++}$ ions of 2.0 to 2.7 g/l, the ratio of the $Ni^{++}$ ions and the $Fe^{++}$ ions ($Ni^{++}/Fe^{++}$) being 7 to 8, and containing a stress release agent and a surface active agent, the pH being 2.5 and 3.5.

Particularly, it is preferable for the thin film magnetic head to be formed by electroplating though a mask in a magnetic field while keeping the temperature of the plating bath at 20 to 35° C. and a current density of 5 to 30 mA/cm².

Further, in the present invention, it is preferable that the thin film magnetic head comprises a magnetic core, the magnetic film being formed using a plating bath to which is added Co ions of 0.4 to 0.6 g/l and/or Cr, Mo, Pd, In, B less than 0.1 g/l.

Further, it is preferable that the magnetic film of the thin film magnetic head is formed by electroplating though a mask in a magnetic field.

In the present invention, writing blur due to the recording frequency and fluctuation of an over-write value are prevented by designing the thickness, resistivity and relative permeability of a magnetic film of a magnetic pole for a write head while taking eddy current loss into consideration, and at the same time by setting the data recording frequency to a high value and rotating a magnetic disk fitted to the above head at a high speed.

(1) It is preferable to provide a means having a transfer rate higher than 15 mega bytes per second, areal density larger than 500 mega bits per square inch.

(2) It is preferable that when storing of information is performed using a magnetic disk having a diameter smaller than 3.5 inches, the magnetic disk is rotated at 4000 rpm during recording and reproducing, and the recording frequency is set to a value above 45 MHz.

(3) It is preferable to provide a magnetic disk using a metallic film having a magnetic coercive force larger than 2 kOe.

(4) It is preferable to set the build-up time of the recording current to a value smaller than 5 nano-seconds (ns).

(5) It is preferable for the coil of an inductive head for performing recording of information on a magnetic disk to be formed through a thin film process, for the number of terminals to be three, and for the inductance between the terminals to be smaller than 1 micro-henry ($\mu$H).

(6) It is preferable for the coil of an inductive head for performing recording of information on a magnetic disk to be of a two-layer structure, for the number of winding turns in the first layer to be equal to that in the second layer, and for the directions of winding to be opposite to each other.

(7) It is preferable for the coil of an inductive head for performing recording of information on a magnetic disk to be of a single-layer structure, and an additional terminal to be connected to a position (c) corresponding to one-half of the number of winding turns between the starting point of the coil (a) and the end point of the coil (b), and for the current flowing between (c) and (a) and the current flowing between (c) and (b) to be in opposite phase to each other.

(8) Letting the film thickness of a magnetic film of a core of an inductive head be d ($\mu$m), resistivity be $\rho$ ($\mu\Omega\cdot$cm) and the relative permeability at a low frequency be $\mu$, it is preferable to provide a means in which these parameters satisfy the relation $\mu d^2/\rho \leq 500$.

(9) It is preferable for at least a part of the recording magnetic pole of a magnetic head used for data recording or data recording and reproducing to be of a multi-layer structure in which a magnetic layer and an insulator layer are alternatively laminated, and for the thickness of the film to be thinner than 2.7 $\mu$m.

(10) It is preferable for the Fe—Ni alloy described above to be used for at least the upper magnetic film of the recording magnetic films of a magnetic head used for data recording or data recording and reproducing, and for a Co base amorphous alloy or an Fe base amorphous alloy to be used for the lower magnetic film.

(11) It is preferable for the material of the recording magnetic pole contains at least one of Zr, Y, Ti, Hf, Al and Si.

(12) It is preferable for the recording magnetomotive force, that is, the product of recording current and number of winding turns of the coil of a magnetic head used for data recording or data recording and reproducing, to be set to a value larger than 0.5 ampere turns (AT).

(13) It is preferable for the resistivity of at least a part of the recording magnetic pole of a magnetic head used for data recording or data recording and reproducing to be larger than 40 $\mu\Omega\cdot$cm and for the relative permeability to be larger than 500.

(14) It is preferable for the recording coil of an inductive head for performing recording of information on a magnetic disk medium to be of a single-layer structure, for an additional terminal to be connected to a position (c) corresponding to one-half of the number of winding turns between the starting point of the coil (a) and the end point of the coil (b), for the current flowing between (c) and (a) and the current flowing between (c) and (b) to be in opposite phase to each other, and for a dual element head using a spin valve element and a giant magnetoresistive element to be used as the reproducing head.

In the high frequency band above the recording frequency of 45 MHz, the head efficiency (efficiency to induce magnetic flux) of the magnetic head is dominated by the eddy current loss. Although, in order to decrease the eddy current loss, it is most effective to decrease the film thickness of the magnetic core, decreasing of the film thickness causes a recording incapability due to a shortage in the recording magnetic flux.

In order to sufficiently record on a medium having a high magnetic coercive force larger than 2000 Oe, particularly above 2300 Oe, the film thickness is required to be larger than 2 $\mu$m and the saturation magnetic flux density is required to be high. In general, a multi-layer film may be employed for decreasing the eddy current loss, but the head process for coping with the high recording density makes it difficult to obtain a high accuracy in the dimensions.

Therefore, it is necessary to decrease the eddy current loss by increasing the resistivity of the magnetic core in order to extend the frequency characteristic of the permeability ($\mu$) of the magnetic core up to a high frequency.

The Ni—Fe magnetic film (3 $\mu$m film thickness) shows a saturation magnetic flux density ($B_S$) larger than 1.5 T and a resistivity ($\rho$) of 40 to 50 $\mu\Omega\cdot$cm when the Ni concentration is within the range of 38 to 60 wt %. That is, when the Ni concentration is below 38 wt %, the specific resistivity ($\rho$) is large, but the saturation magnetic flux density ($B_S$) becomes lower than 1.5 T.

On the other hand, when the Ni concentration is above 60 wt %, the saturation magnetic flux density ($B_S$) also becomes lower than 1.5 T. Especially, it is preferable for the concentration of Ni to be 40 to 50 wt %.

A plating process is suitable for fabricating a film having such a composition. That is, since the crystal grain size can be made very small using an electroplating method, the magnetic coercive force can be made small and the orientation of the crystal can be decreased as low as possible even in a case of a composition having a large magnetocrystalline anisotropy. For example, it is preferable that the orientation ratio of the crystal is suppressed below 5.0, that is (111)/(200)<5.0.

The composition of a plating bath for fabricating such a film has Ni and Fe ion concentrations at $Ni^{++}$: 15 to 20 g/l, $Fe^{++}$: 2.0 to 2.7 g/l, and the ion ratio ($Ni^{++}/Fe^{++}$) at 7 to 8. In this case, the plating current density is 10 to 20 mA/cm², the pH is 3.0, and the bath temperature is 30° C.

On the other hand, in the case of adding at least one of the elements Co, Mo, Cr, B, In and Pd, it is preferable for the Co to be less than 15 wt % and for the Mo to be less than 3 wt % in order to keep the saturation magnetic flux density ($B_S$) higher than 1.5 T and the resistivity ($\rho$) larger than 40 $\mu\Omega\cdot$cm.

In a case of using Co as a component in the bath, it is preferable to add up to $CoSO_4\cdot6H_2O$ of 100 g/l (Co ions of 21 g/l), and in a case of Mo, $Na_2MoO_4\cdot2H_2O$ of 4.8 g/l (Mo ions of 1.9 g/l). For example, in a case of adding Cr $[Cr_2(SO_4)_3\cdot18H_2O]$ instead of Mo, the same effect can be observed In a case of adding B or In, the resistivity ($\rho$) is increased not as much as about 10%.

On the other hand, in the case of adding Co, the saturation magnetic flux density ($B_S$) is increased by nearly 10%, though the resistivity ($\rho$) of the film is slightly deceased. Therefore, it is preferable to use Co together with Mo. Further, since Co increases the anisotropic magnetic field ($H_K$), Co is preferable for stabilizing the magnetic characteristic.

When Co is added in an amount more than 15 wt %, the saturation magnetic flux density ($B_S$) of the film is increased, but the resistivity ($\rho$) of the film is deceased too much. Therefore, the resistivity ($\rho$) of the film cannot be increased up to a desired value unless a large amount of Mo, Cr are added.

This is not preferable because the magnetic coercive force of the film becomes large. In order to increase the resistivity ($\rho$) without increasing the magnetic coercive force of the film, the amount of Mo, Cr to be added should be limited to 3 wt % or less.

In the case of adding B, In, Pd or the like, the amount added should be limited as indicated above. In these cases, the plating condition may be the same as in the case of a Ni—Fe magnetic film, as described above.

Assuming that the high frequency loss (tan δ) of the magnetic film is attributed only to the eddy current loss, the high frequency loss can be expressed by the following equation:

$$\tan\delta = \mu''/\mu' \quad (1)$$
$$= R/\omega L$$
$$= \mu_0\mu\prod d^2 f/C\rho$$

where $\mu'$ and $\mu''$ are a real part and an imaginary part of the complex magnetic permeability. C is a constant determined by the shape of the film, and $\mu_0$ is the permeability of a vacuum.

From the above equation (1), when the relative permeability $\mu$ inherent in the magnetic film, the film thickness d, and the resistivity $\rho$ are given, the eddy current loss tan $\delta$ corresponding to the frequency f can be obtained. Since the change of the head efficiency (efficiency to induce magnetic flux) corresponding to the frequency is proportional to the change in the real part of the complex permeability, the frequency dependence of the head efficiency can be obtained by calculating $\delta$ from Equation (1) and taking the cosine component.

That is, the head efficiency $\eta$ for each frequency can be expressed by the following equation.

$$\eta = \cos[\arctan(\mu_0\mu\Pi d^2 f/C\rho)] \quad (2)$$

From Equation (2), by specifying the value $\mu d^2/\rho$ which can be obtained from the relative permeability $\mu$ inherent in the magnetic film, the film thickness d and resistivity $\rho$, the head efficiency $\eta$ for an arbitrary frequency f can be extrapolated.

By combining the above head and a magnetic disk using a metallic magnetic film having a magnetic coercive force larger than 2 kOe, which exhibits a small write blurring during high frequency recording and a small fluctuation of overwriting, it is possible to obtain a high performance disk storage system having areal density larger than 500 MB/in$^2$, a recording frequency higher than 45 MHz and a transfer rate higher than 15 MB/s.

In a case of using a fast and wide SCSI (Small Computer System Interface) having a data bus of two-byte width as an I/O interface, from the relationship between the price of an input/output device and a transfer rate per one magnetic disk device composing the input/output device, it is possible to transmit data up to 20 MB/s at a maximum when the fast and wide SCSI having a data bus of two-byte width as an I/O interface is used.

In this case, when the transfer rate per one magnetic disk device is above 15 MB/s, it can be understood that the price of the input/output device can be decreased.

Further, when the capacity per one magnetic disk device is 550 MB, it is possible to employ an OS (Operation Software) such as Windows, Workplace and the like. In order to realize this capacity with one magnetic disk of 3.5 inch type, areal density capable of recording the data is required to be 500 MB/in$^2$.

According to the present invention, a recording head, which is capable of performing sufficient recording to a medium having a high magnetic coercive force and at a high frequency range, is fabricated by a specified composition and through a low cost electroplating method.

Thereby, it is possible to obtain a disk storage system with a high recording density capable of a high data transfer rate, decreasing access time and increasing memory capacity by keeping a transfer rate higher than 15 MB/s, a recording frequency higher than 45 MHz, and the rotating speed of the magnetic disk higher than 4000 rpm.

DESCRIPTION OF THE INVENTION

Hereinafter, various embodiments of a disk storage system, a thin film magnetic head therefor and a fabrication method thereof according to the present invention will explained with reference to the drawings.

Figure 1:
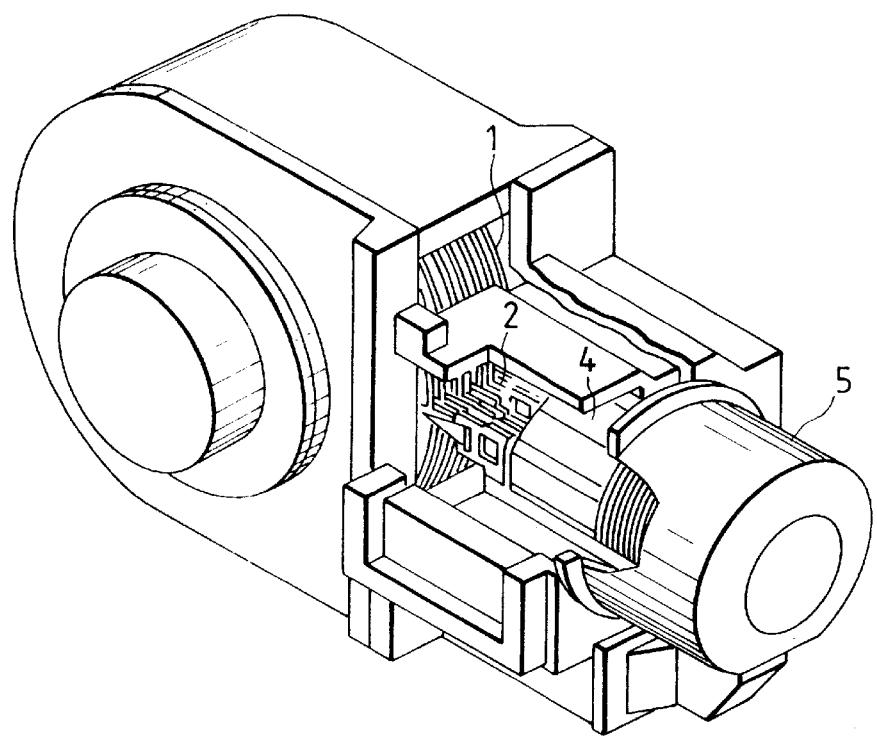
FIG. 1 is a perspective view showing a disk storage system.
Figure 2:
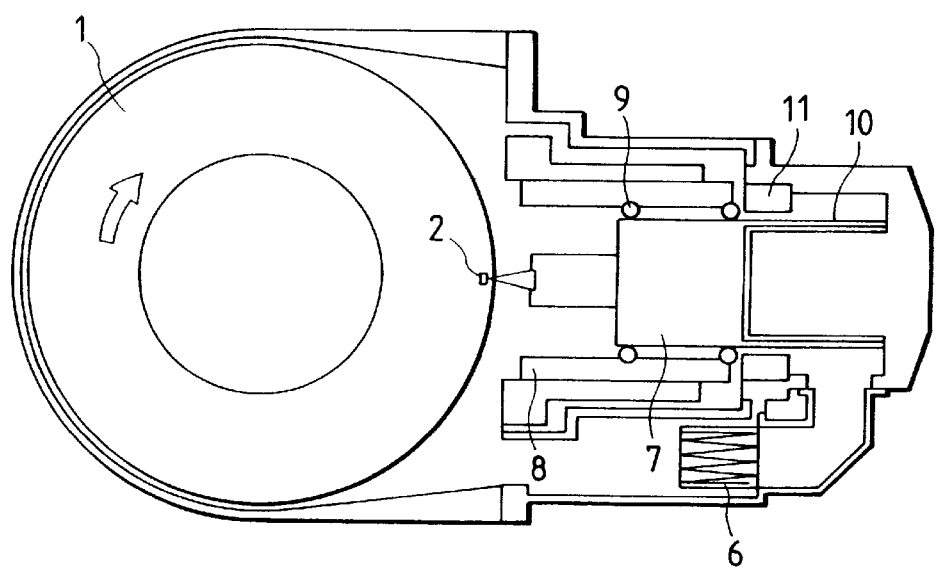
FIG. 2 is cross-sectional view showing a disk storage system.

FIG. 1 and FIG. 2 are a perspective view and a plan view showing an embodiment of a disk storage system in accordance with the present invention. The disk storage system is composed of a magnetic disk 1 for recording information, a DC motor (not shown in the figures) operating as a means to rotate the magnetic disk, a magnetic head 2 for writing and reading information, a positioning device operating to support the magnetic head 2 and to change the position of the magnetic head 2 with respect to the magnetic disk 1, which positioning device is composed of an actuator 4, a voice coil motor 5 and an air filter 6 for keeping the inside of the system clean.

The actuator 4 is composed of a carriage 7, a rail 8, and a bearing 9. The voice coil motor 5 is composed of a voice coil 10 and a magnet 11. These figures show an example wherein eight magnet disks are attached to a single rotating shaft to make the memory capacity large.

Figure 3:
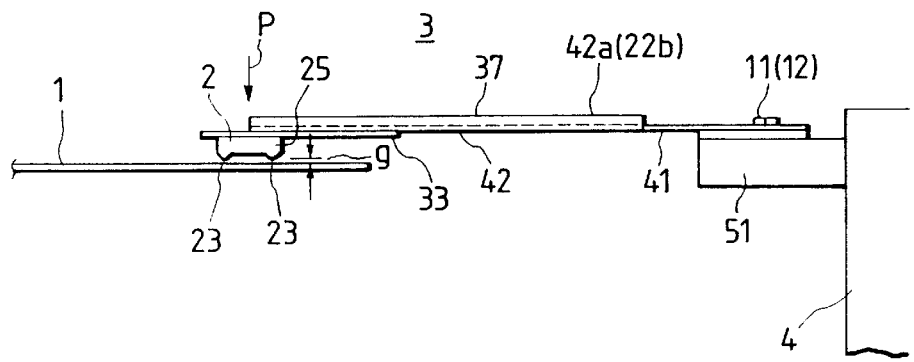
FIG. 3 is a front view showing a portion of the disk storage system.
Figure 4:
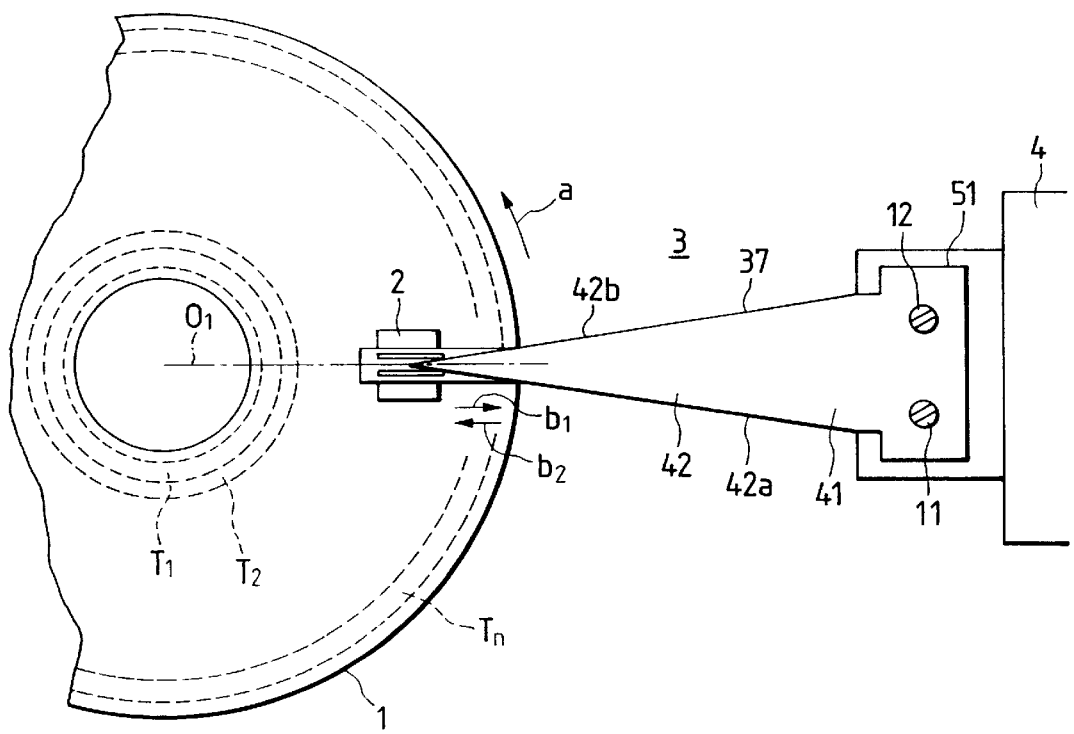
FIG. 4 is a top plan view showing a portion of the disk storage system.

FIG. 3 is a front view of a disk storage system in accordance with the present invention, and FIG. 4 is a plan view of the disk storage system. In the figures, the reference character 1 denotes a magnetic disk, the reference character 2 denotes a magnetic head, the reference character 3 denotes a gimbal system supporting device, and the reference character 4 denotes a positioning device (actuator).

The magnetic disk 1 is rotated in the direction of the arrow a by a rotating driving mechanism. The magnetic head 2 is supported by the supporting device 3 and is moved in the direction of the arrow $b_1$ or $b_2$ on the rotating diameter $O_1$ so as to be positioned, and thereby magnetic recording or reproducing is performed using a proper one of the cylinders $T_1$ to $T_n$.

The magnetic disk 1 is a medium having a surface roughness $R_{MAX}$ less than 100 Å, preferably a medium having a better surface condition of surface roughness less than 50 Å.

The magnetic disk 1 is made by forming a magnetic recording film on the surface of a rigid substrate through a vacuum film forming method. The magnetic recording film is formed as a magnetic thin film made of $\gamma$-$Fe_2O_3$ or Co—Ni, Co—Cr or the like.

Since the film thickness of the magnetic recording film formed through the vacuum film forming method is thinner than 0.5 $\mu$m, the surface characteristic of the rigid substrate directly reflects on the surface characteristic of the recording film.

Therefore, a rigid substrate having a surface roughness $R_{MAX}$ which is less than 100 Å is used. A rigid substrate having a major component of glass, chemically reinforced soda-alumina silicate glass or ceramic is suitable for such a rigid substrate.

The magnetic recording film may be formed of a magnetic iron oxide, such as $\gamma$-$Fe_2O_3$ or the like, or a magnetic nitride. In a case where the magnetic film is a metal or an alloy, it is preferable for an oxide film or a nitride film to be provided on the surface or an oxide covering film to be formed on the surface. It is also preferable to use a carbon protecting film.

By doing so, the durability of the magnetic recording film is improved and accordingly the magnetic disk 1 is protected from damage, which may be caused in a case where recording or reproducing is performed under a very low floating condition or at a contact-start-stop condition.

The oxide film or the nitride film may be formed through reactive sputtering, reactive vapor depositing or the like. The oxide coating film may be formed by intentionally oxidizing the surface of a magnetic recording film made of a metal or an alloy containing at least one kind of iron, cobalt and nickel, such as Co—Ni or Co—Cr, through reactive plasma treatment or the like.

The magnetic disk 1 may be either of perpendicular recording type, where the recording residual magnetization in the magnetic recording film has a component in the perpendicular direction with respect to the film surface as a major component, or of the longitudinal recording type, where the recording residual magnetization has a longitudinal component as a major component.

It is also possible to apply a lubricant on the surface of the magnetic recording film though this is omitted in the figure.

Figure 5:
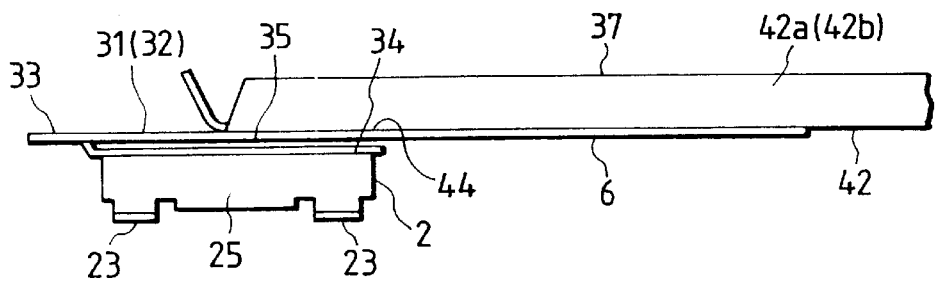
FIG. 5 is a side view of a magnetic head and a supporting device.
Figure 6:
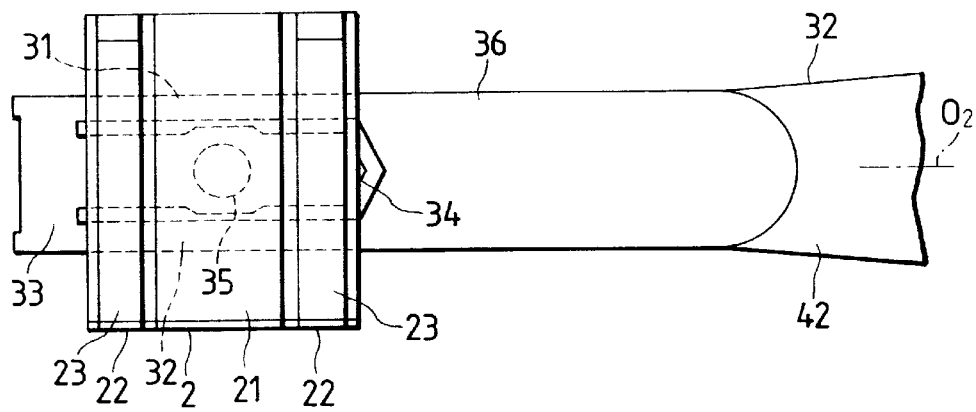
FIG. 6 is a top view of a magnetic head and a supporting device.

FIG. 5 and FIG. 6 are views showing the assembled construction of the magnetic head 2 and the gimbal system supporting device 3.

The magnetic head 2 has reading and writing elements 22 in the side of an air flow-out end of a slider 25 of a ceramic structure body and is supported by the supporting device 3 driven by a positioning device 4 so as to be allowed a pitching motion and rolling motion by adding a load on the surface 24 opposite to a floating surface 23. The reading and writing element 42 is a thin film element formed through the same process as that of IC fabricating technology.

The supporting device 3 is constructed by attaching and fixing one end of a supporting body 37, formed of an elastic metallic thin film, to a rigid arm part 51 attached to the positioning device 4 using jointing members 11, 12, and by attaching a flexible body 36, formed of a similar metallic thin film, to a free end on the other end in the lateral direction of the supporting body 37, and by attaching the magnetic head 2 on the underside surface of the flexible body 36 (refer to FIG. 3 and FIG. 4.

The portion of the supporting body 37 attached to the rigid arm part 51 has an elastic spring part 41, and a rigid beam part 42 is connected to the elastic spring part 41. The rigid beam part 42 has flanges 42a, 42b formed by bending up both sides.

The flexible body 36 comprises two outer flexible frame parts 31, 32 extending nearly in parallel to the axial line in the lateral direction of the supporting body 36, and a side frame 33 joining the outer flexible frame parts 31, 32 in the end opposite the supporting body.

The flexible body 36 comprises further a middle tongue-shaped part 34 having one end forming a free end extending from near the middle portion of the side frame 33 along and nearly in parallel to the side flexible frame, and the one end at the opposite side to the side frame 33 is attached to the vicinity of the free end of the supporting body 37 by welding or the like.

On the upper surface of the middle tongue-shaped part 34 of the flexible body 36, a projection 35 for load, for a example, a semi-spherical projection is provided, and a load is transmitted from the free end of the supporting body 37 to the middle tongue-shaped part 34. The surface 24 of the magnetic head 2 is fixed to the under surface of the middle tongue-shaped part 34 by an adhesive.

In this embodiment, a magnetic disk 1 having a surface roughness $R_{MAX}$ is used and the floating amount g at the starting of floating the magnetic head 2 is set within the range of 0.01 $\mu$m to 0.04 $\mu$m.

The floating amount g of the innermost cylinder $T_n$ among the reading and writing cylinders $T_1$ to $T_n$ provided in the magnetic disks 1 is set between the floating amount g at the starting of floating of 0.01 $\mu$m to 0.04 $\mu$m and a value several times that of the floating amount.

The shape of the slider 21 constructing the magnetic head 2, the load applied from the supporting device 3 to the magnetic head 2, the rotating speed of the magnetic disk 1 and so on are set so as to obtain the floating amount as described above.

Figure 7:
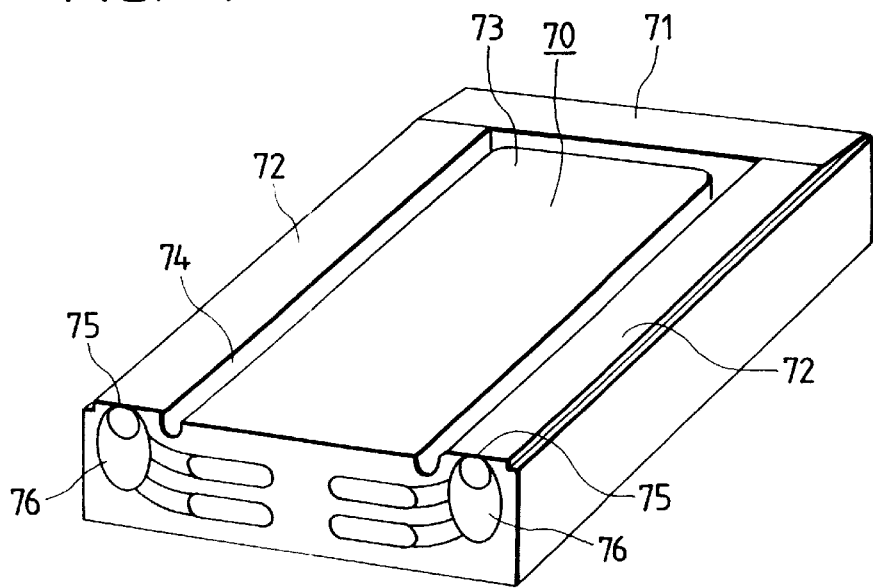
FIG. 7 is a perspective view showing a slider having a thin film magnetic head.

FIG. 7 is a perspective view showing a negative pressure slider. The load slider 70 comprises an air intake surface 71 and a negative pressure generating surface 73 surrounded by two positive pressure generating surfaces 72, 72 for generating a floating force, and a groove 74 having a step larger than the negative pressure generating surface 73 in the boundary between the air intake surface 71, the two positive pressure generating surfaces 72, 72 and the negative pressure generating surface 73.

On an air outlet end 75, the negative pressure slider 70 also has thin film magnetic head elements 76 for recording and reproducing information on and from a magnetic disk 1.

During floating of the negative pressure slider 70, the air introduced through the air intake surface 71 is expanded at the negative pressure generating surface 73. At that time, since an air flow flowing toward the groove 74 is also generated, there exists inside the groove 74 an air flow flowing from the air intake surface 71 toward the air outlet end 75.

Therefore, dust floating in the air is forced to flow by the air flow inside the groove 74 and is exhausted from the air outlet end 78 to the outside of the negative pressure slider 70 even if the dust floating in the air enters through the air intake surface 71 during floating of the negative pressure slider 70.

Further, since there is an air flow, stagnation inside the groove 74 during floating of the negative pressure slider 70 is avoided, and dust is not accumulated inside the groove 74.

Figure 8:
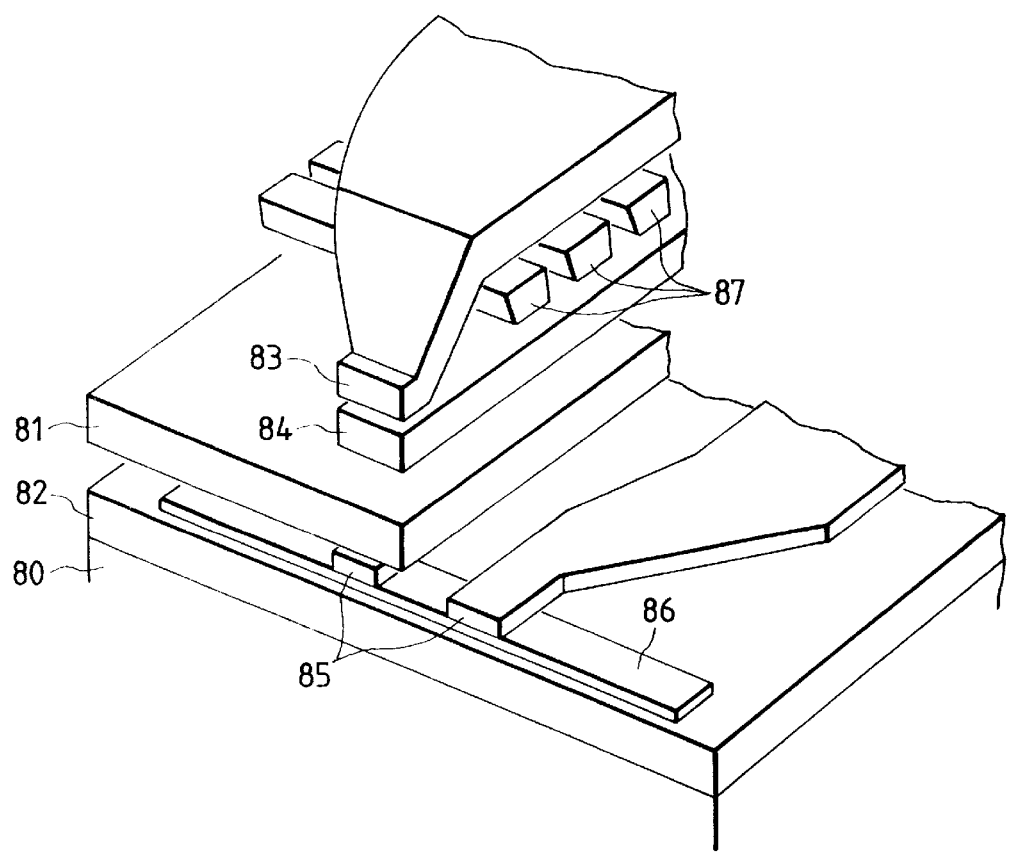
FIG. 8 is a perspective view showing a dual element head.

FIG. 8 is a conceptual view of a dual element head forming a recording head. The dual element head comprises an inductive head and a reproducing head, and a shield part is provided for preventing disturbance in the reproducing head due to leakage magnetic flux.

Although mounting of the recording head for a perpendicular magnetic recording is shown in this embodiment, the magnetoresistive element according to the present invention may be used for a perpendicular recording by combining it with a head for vertical magnetic recording. The head is formed with a reproducing head composed of a lower shield film 82 on a substrate 80, a magnetoresistive film 86, an electrode 85 and an upper shield film 81, and a recording head composed of a lower magnetic film 84, a coil 87 and an upper magnetic film 83.

By using this head, signals are written on the recording medium and signals are read out from the recording medium. The magnetic gap between the sensing part of the reproducing head and the recording head can be positioned at the same track at the same time by forming it at an overlapping position on the same slider, as described above. This head is formed in a slider and mounted on a disk storage system.

In this embodiment, the upper and the lower magnetic films of the inductive head are formed through the following fabrication method.

There is fabricated an inductive head having upper and lower magnetic cores which are electroplated in a plating bath containing $Ni^{++}$ of 16.7 g/l, $Fe^{++}$ of 2.4 g/l, and a common stress-release agent and a surface active agent under a condition of pH of a 3.0 and a plating current density of 15 mA. The track width is 4.0 µm, and the gap length is 0.4 µm.

The composition of this magnetic film is 42.4 Ni—Fe (wt %), and as to the magnetic characteristics, the saturation magnetic flux density ($B_S$) is 1.64 T, the magnetic coercive force in the hard axis direction ($H_{CH}$) is 0.5 Oe, the and resistivity (ρ) is 48.1 µΩ·cm.

The inductive head comprises an upper magnetic core 83, a lower magnetic core 84 which also serves as an upper shield film, a coil 87, a magnetoresistive element 86, an electrode 85 for conducting a sense current to the magnetoresistive element, a lower shield film 82 and a slider 80.

Figure 9:
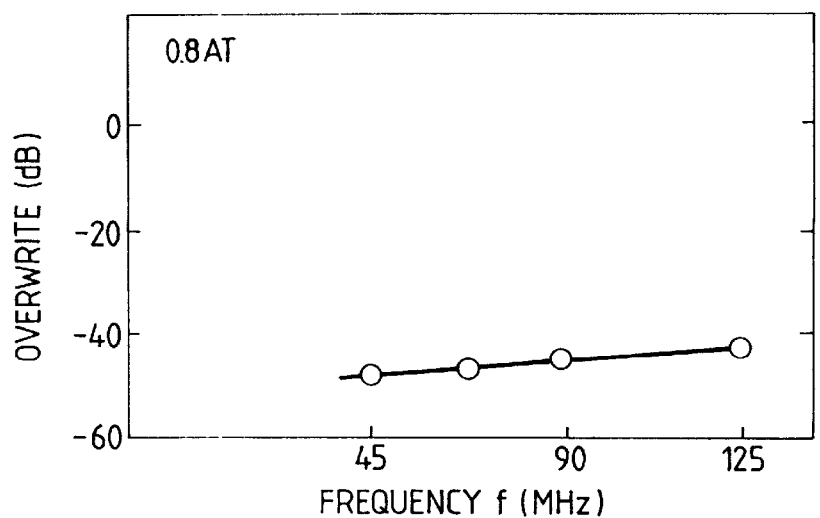
FIG. 9 is a graph showing the relationship between frequency and overwrite.

FIG. 9 shows the evaluated result of the performance (over-write characteristic) of the recording head according to the present invention having such a construction. An outstanding recording characteristic of nearly −50 dB in a high frequency range above 40 MHz has been obtained.

Figure 10:
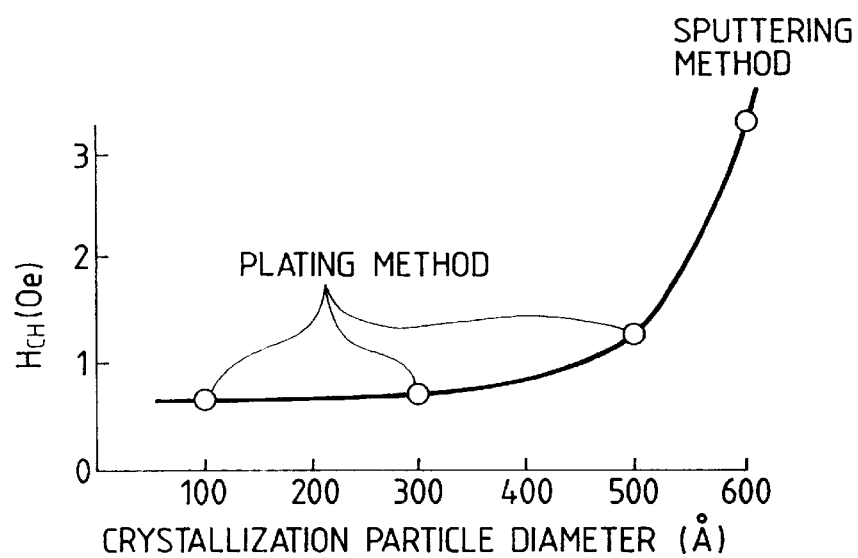
FIG. 10 is a graph showing the relationship between crystal grain size and magnetic coercive force in the hard axis direction.

FIG. 10 shows the relationship between the magnetic coercive force in the hard axis direction and the average crystal grain size of magnetic films obtained through the plating method and the sputtering method in this embodiment. It can be understood that when the average crystal grain size is smaller than 500 Å, low magnetic coercive force lower than 1.0 Oe can be obtained.

Further, for the lower magnetic film, a Ni—Fe alloy thin film composed of Ni 70 to 80 wt % and Fe comprising the remainder, may be formed through electroplating, in the same way as described above, or the alloy film may be also formed through a sputtering method.

Figure 11:
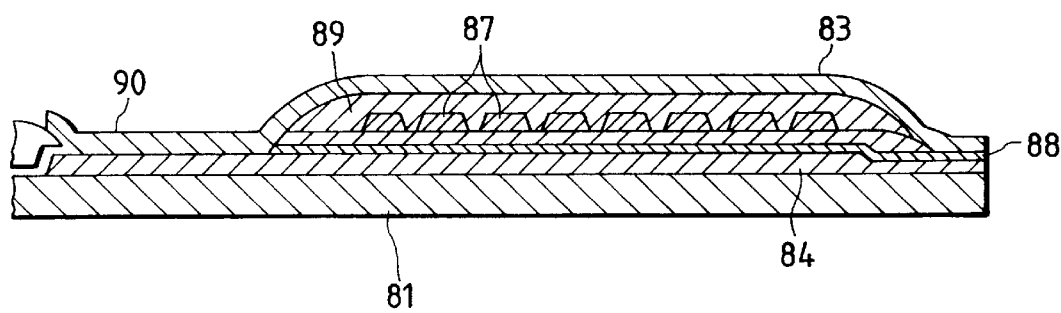
FIG. 11 is a cross-sectional view showing an inductive head.
Figure 12:
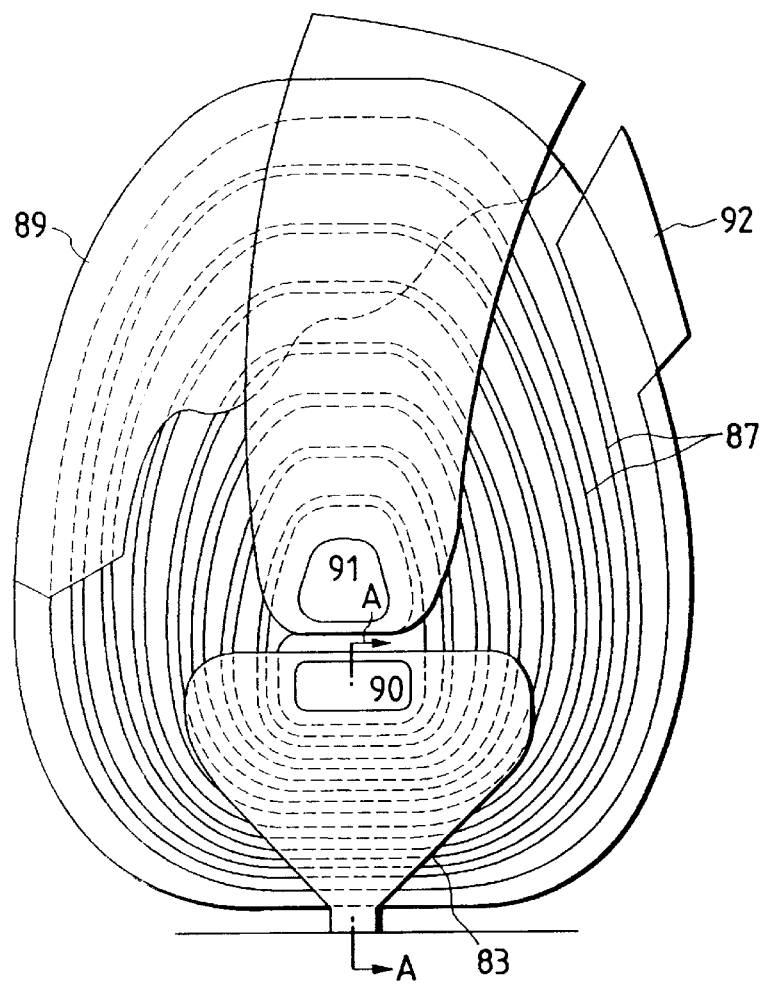
FIG. 12 is a plan view showing an inductive head.

FIG. 11 is a cross-sectional view and FIG. 12 is a plan view showing an inductive head according to the present invention. The thin film head comprises an upper shield film 81, a lower magnetic film 83 attached onto the upper shield film and an upper magnetic film 84 which are made of the aforementioned magnetic film.

FIG. 11 is a cross-sectional view taken on the plane of the line A—A of FIG. 12. A non-magnetic insulator body 89 is disposed between layers 83, 84. A part of an insulator body determines a magnetic gap 88, and this interacts in a conversion relationship with, for example, a magnetic medium placed in an air-bearing relation, as in the prior art.

The supporting body 80 serves as a slider having an air-bearing surface (ABS), and this accesses and is in a floating relation with respect to a rotating disk during disk file operation.

The thin film magnetic head has a back gap 90 formed by an upper magnetic film 83, a lower magnetic film 84. The back gap 90 is separated from the magnetic gap by a coil 87 interposed between.

The continuing coil 87 forms a layer on the lower magnetic film 84, for example, through plating to electromagnetically couple with the lower magnetic film. The coil 87 has an electric contact point 91 in the center of coil which is buried with insulator body 89, and also has a large area serving as an electric contact point 92 in the outer end terminal point of the coil. The contact points are connected to external lead wires and a reading and writing signal processing head circuit (not shown).

In accordance with the present invention, the coil 87 formed in a single layer has a slightly deformed elliptical shape, and the portion having a small cross-sectional area is placed in the nearest position to the magnetic gap and the cross-sectional area gradually increases as the distance from the magnetic gap increases.

The back gap 90 is positioned relatively near the ABS of the magnetic gap. However, there exists relatively densely many windings of the elliptical coil between the back gap 90 and the magnetic gap 88, and the width or the cross-sectional diameter of the coil is small in this region. The large cross-sectional diameter in the farthest region from the magnetic gap decreases the electrical resistance.

The elliptical coil does not have any angle or sharp corner or edge, and therefore resistance to current is small. Further, the total length of the conductor of the elliptical coil is short compared with a rectangular or a circular (ring-shaped) coil.

Due to these advantages, the total resistance of the coil is relatively small, and consequently heat generation is small and heat is properly radiated. Since heat generation is substantially decreased, collapse, extension and expansion of the thin film are prevented and the cause of ball-tip projection is eliminated.

The shape of the elliptical coil, the width of which uniformly changes, can be formed through a conventional economical technology, such as a sputtering or vapor deposition method.

In a coil having a different shape, particularly a shape having corners, plating deposition is apt to become non-uniform in width. A coil having removed corners or sharp edge portions is subjected to a small mechanical stress.

In accordance with this embodiment, a nearly elliptical coil having multiple winding turns is formed between the magnetic cores, the cross-sectional diameter of the coil gradually expands from the magnetic gap toward the back gap, the signal output power is increased and the heat generation is decreased.

Figure 13:
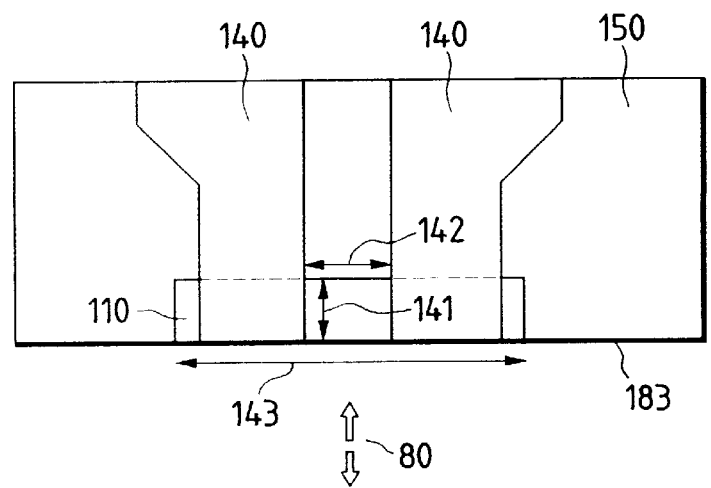
FIG. 13 is a plan view showing the construction of a film of a magnetoresistive head.

FIG. 13 is a conceptual view showing the construction on the surface of a substrate of a magneto-resistance effect element in accordance with the present invention, when formed on the bottom portion of the above mentioned inductive head.

The magnetoresistive film 110 is formed along a surface 163 opposed to a recording medium in a long rectangular shape having a length 143 of the element on a substrate 150. This definition of the shape has an effect to provide a proper shape magnetic anisotropy in the perpendicular direction with respect to a direction 180 in which the magnetic field to be detected by the magnetoresistive film 110 is applied.

A current is conducted in the magnetoresistive film 110 from electrodes 140 electrically contacting the film, and an output is obtained from the resistance change of the film caused by the magnetic field applied to the magnetic field detecting portion having a width 141 in the direction parallel to and the width 142 in the direction perpendicular to the surface of the recording medium 191.

Although in this conceptual view the end portions of the magnetoresistive element are exposed to the opposite surface of the recording medium, the mechanical durability of the element can be increased by arranging a yoke-shaped soft magnetic body on the opposite surface to guide the magnetic field from a recording medium and by magnetically coupling to a magnetoresistive element arranged inside.

Especially, the resistance of the magnetic circuit is reduced and the sensitivity can be improved by decreasing the MR height of the element.

Figure 14:
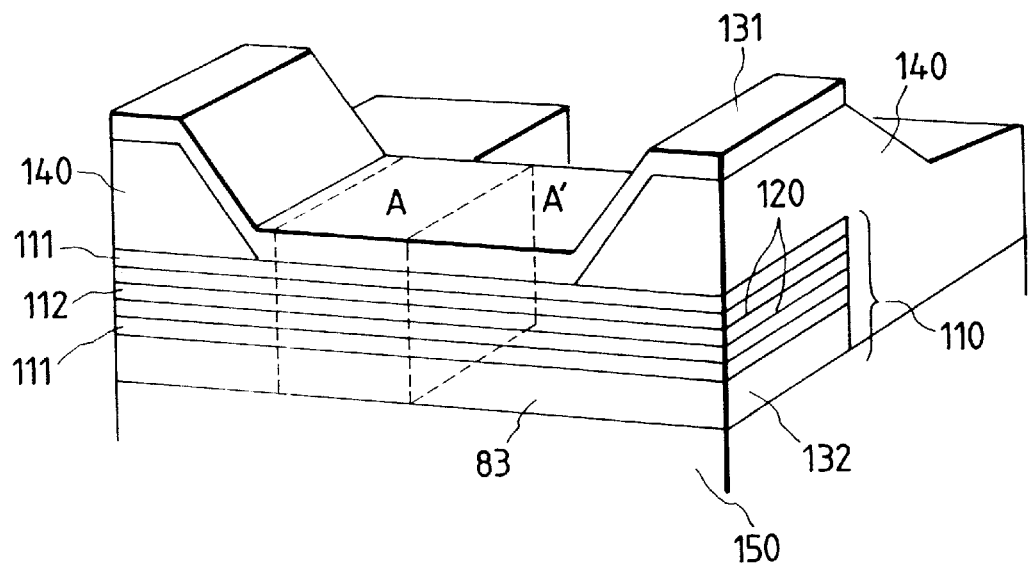
FIG. 14 is a perspective view showing the construction of a film of a magnetoresistive head.

The magnetoresistive element according to the present invention has a construction, for example, as shown in FIG. 14. The magnetoresistive element is formed by laminating on a substrate 150 a magnetoresistive film 110, that is, a film consisting of a bias film 132, a magnetic film 111, a non-magnetic conductive film 120, a magnetic film 112, a non-magnetic conductive film layer 120, and a magnetic film layer 111, with a bias film 131, and further disposing an electrode 140 on the laminated layer by electrical joining.

In the construction of the element shown in FIG. 12, an electrode 140 is placed under a bias film 131. This is an example of an effective construction in a case where an insulator film, such as nickel oxide film, is used for the upper bias film.

Another construction of the electrode may be formed in such a manner, for example, that a bias film is partially formed and then an electrode is formed over the bias film. There are still other methods where a conductive bias film, for example, a Fe—Mn film, a Co—Pt film or the like, is formed and then an electrode is formed directly on the conductive bias film.

The present element is constructed by alternatively laminating a magnetic film applied with a strong anisotropy by a bias film, a magnetic film applied with a weaker anisotropy than the above anisotropy by uniaxial magnetic anisotropy, a shape magnetic anisotropy or a soft film bias through a non-magnetic conductive film so as to conduct current to each other but not cause magnetic coupling between them. Especially, the direction of application of the anisotropy will be described below.

Figure 15:
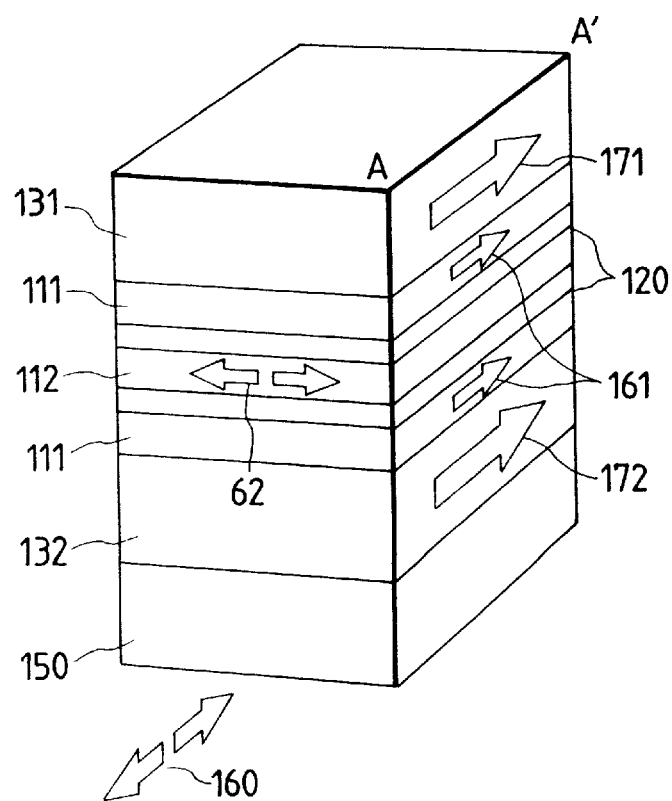
FIG. 15 is a perspective view showing the construction of a film of a magnetoresistive head.

FIG. 15 is a conceptual view showing an example of anisotropy control in a magnetoresistive element in accordance with the present invention, and is a perspective view of a part of the element shown by A–A' in FIG. 14.

The bias films 131 and 132 apply anisotropy by switched connection in the directions indicated by the arrows 171 and 172 in the figure. The arrow 160 in the figure indicates the direction of the magnetic field to be detected, and the arrow 161 indicates the direction of unidirectional magnetic anisotropy induced in the magnetic film 111.

The easy magnetizing of the magnetic film 112 sandwiched by the non-magnetic conductive films 120 is in the direction indicated by the arrow 162 in the figure by induction of uniaxial magnetic anisotropy. This can be attained by applying a magnetic field in a proper direction during the growing of the magnetic film.

The embodiment shown by the figure is an example in which the application of the anisotropy is attained by the bias film and the inductive magnetic anisotropy. As a result, the arrows 161 and 162 intersect at a right angle with each other on the surface of the film.

By setting the anisotropy of the magnetic film 111 to be larger and anisotropy of the magnetic film 112 to be smaller than the magnitude of the magnetic field to be detected, the magnetization of the magnetic film 111 can be fixed to a nearly constant value and only the magnetization of the magnetic film 111 can largely react to an external magnetic field.

Further, the magnetization of the magnetic film 111 is in a state of easy axis excitation with respect to the magnetic field to be detected where the directions of the magnetization and the external magnetic field are parallel to each other due to anisotropy 161.

On the other hand, the magnetization of the magnetic film 112 is in a state of hard axis excitation where the directions of the magnetization and the external magnetic field are perpendicular to each other. With this effect, the response described above becomes even more outstanding.

In addition to this, the element becomes capable of operating at a high frequency since a state is reached where the element is driven by an external magnetic field in the hard axis excitation direction due to rotation of the magnetization of the magnetic film 112 with respect to the direction of the arrow 162 as an origin, and accordingly the noise accompanied by excitation of movement of the magnetic domain wall is prevented.

There is another embodiment of a magnetoresistive element in which the application of anisotropy is performed by two different kinds of bias films, that is, an anti-ferromagnetic film and a hard-magnetic film.

The magnetoresistive element is formed by laminating on a substrate 150 an anti-ferromagnetic film 132, a magnetic film 111, a non-magnetic film 120, a magnetic film 112 and a hard-magnetic film 133, and then by connecting an electrode on the laminated film. Both of the anti-ferromagnetic film 132 and the hard-magnetic film 133 are respectively fixed to two of the magnetic films 111, 112 separated by the non-magnetic film.

The directions of magnetization of the magnetic films 111 and 112 are induced in the directions indicated by the arrows 161 and 162 respectively by performing thermal treatment under a magnetic field or magnetizing treatment in the directions 172 and 173, a parallel direction and a perpendicular direction to the direction 160 of the magnetic field to be detected.

The anti-ferromagnetic film is formed of, for example, a nickel oxide, and the hard-magnetic film is formed of a cobalt-platinum alloy. The same effect may be obtained when the positions of the hard-magnetic film and the anti-ferromagnetic film are reversed, or the directions of induced magnetization are reversed.

The films composing the magnetoresistive element according to the present embodiment are fabricated using a high frequency magnetron sputtering apparatus in a manner indicated as follows.

Magnetoresistive elements have been fabricated by successively laminating the following materials on a ceramic substrate and a Si single crystal substrate of 1 mm thickness and 3 inches diameter in an argon atmosphere of 3 milli-Torrs. As a sputtering target, targets of nickel oxide, cobalt, a nickel-20 at % iron alloy and copper are used.

The addition of cobalt to nickel-20 at % iron is preformed by placing a cobalt chip on a nickel-20 at % iron target. The addition of nickel and iron to cobalt is performed by placing nickel and iron chips on a cobalt target.

The laminated film is formed by applying high frequency electric power to each cathode while placing each of the targets so as to generate a plasma inside the system and then by opening and closing a shutter provided for each of the cathodes one by one to form each of the films successively.

During the forming of the films, a magnetic field of approximately 50 Oe is applied in parallel to the substrate using two pairs of magnets crossing at right angle to each other on the surface of the substrate to form an uniaxial magnetic anisotropy in the film and to induce the direction of the switched connection bias of a nickel oxide film to each direction.

The induction of anisotropy is performed by applying a magnetic field in the direction to be induced during the forming of each magnetic film using two pairs of magnets provided near a substrate. Otherwise, the anti-ferromagnetic bias is induced in the direction of a magnetic field by performing heat treatment under a magnetic field at a temperature near the Neel temperature of the anti-ferromagnetic film after forming the multi-layer film.

An evaluation of performance of the magnetoresistive element is conducted by patterning the film in a rectangular shape and forming electrodes. At this time, the patterning and electrode forming are performed so that the direction of the uniaxial magnetic anisotropy of the magnetic film becomes parallel to the direction of the current in the element.

The measurement is performed by conducting a constant current between the electrode terminals, applying a magnetic field in the surface of the element in the direction perpendicular to the direction of current flow, measuring the electrical resistance of the element using the voltage between the electrode terminals, and detecting the measured results as the magnetoresistance ratio.

In Table 1, the characteristic of the element is expressed by the magnetoresistance ratio and the saturation magnetic field. The reproducing output of the element corresponds to the largeness of the magnitude of the magnetoresistance ratio and the sensitivity corresponds to the smallness of the magnitude of the saturation magnetic field.

It is clear from the result of Table 1 that the magnetoresistive elements No. 1 to No. 5 have a magnetoresistance ratio larger than 4% and a better magnetic characteristic, and are outstanding particularly in the resistance changing rate compared to No. 6 and No. 7.

Among them, the specimen No. 1, No. 2 and No. 4 show an excellent magnetic field sensitivity of about 10 Oe saturation magnetic field and a high output of 6 to 7% magnetoresistance ratio.

TABLE 1

| Spe. No. | Composition/Thickness of film (Å) | MS | $H_s$ |
|---|---|---|---|
| 1 | NiO/FiFe/Cu/NiFe/Cu/NiFe/NiO 300/60/21/40/21/60/300 | 6.5 | 12 |
| 2 | NiO/Co/Cu/NiFe/Cu/Co/NiO 300/50/21/40/21/50/300 | 7.2 | 13 |
| 3 | NiO/NiFe/Cu/NiFe/Cu/NiFe/Cu/NiFe/NiO 300/60/21/40/21/40/21/60/300 | 5.5 | 11 |
| 4 | NiO/Co/Cu/Co/NiFe/Co/Cu/Co/NiO 300/60/21/15/40/15/21/60/300 | 7.5 | 16 |
| 5 | NiO/NiFe/Cu/NiFe 300/60/21/40 | 4.5 | 15 |
| 6 | NiFe/Cu/NiFe/NiO 60/21/40/300 | 3.0 | 14 |
| 7 | NiFe/Cu/NiFe/NiO 60/21/40/150 | 3.9 | 10 |

Note
Spe.: specimen
Mr: magnetoresistance ratio (%)
$H_s$: saturation magnetic field (Oe)

In the disk storage system of the present embodiment, the region sandwiched by a pair of electrodes 85, which region represents the reproducing track width, is set to 2 μm. During recording, a current of 15 $mA_{op}$ is conducted to the coil 87 having 20 winding turns to record any information on a medium.

On the other hand, during reproducing, a direct current of 8 mA is conducted to the lead wire to detect leakage magnetic field from the medium.

A disk storage system is constructed by combining this magnetic head with a 3.5 inch magnetic disk having a CoCrTa (adding amount of Cr is 16 at %) recording film with a magnetic coercive force in the recording bit direction of 2100 Oe and a magnetic coercive force orientation ratio of 1.2.

The production Br.δ of the residual magnetic flux density and the film thickness of the magnetic disk recording film used is 100 Gauss·μm. The specification of the magnetic memory apparatus constructed in accordance with this embodiment is shown in Table 2.

TABLE 2

Specification if a 3.5 inch Type Apparatus using a Dual Element Head

| | |
|---|---|
| Memory Capacity | 5.5 GB |
| Number of Disks | 4 |
| Number of Data Surfaces | 8 |
| Number of Heads | 8 |
| Number of Tracks/Disk Surface | 7378 |
| Maximum Linear Recording Density | 170 kBPI |
| Track Density | 8.3 kTPI |
| Rotating Speed | 4491 RPM |
| Recording Frequency | 80.0 MHz |
| Transfer Rate (to/from Media) | 18 MB/sec |

Figure 16A:
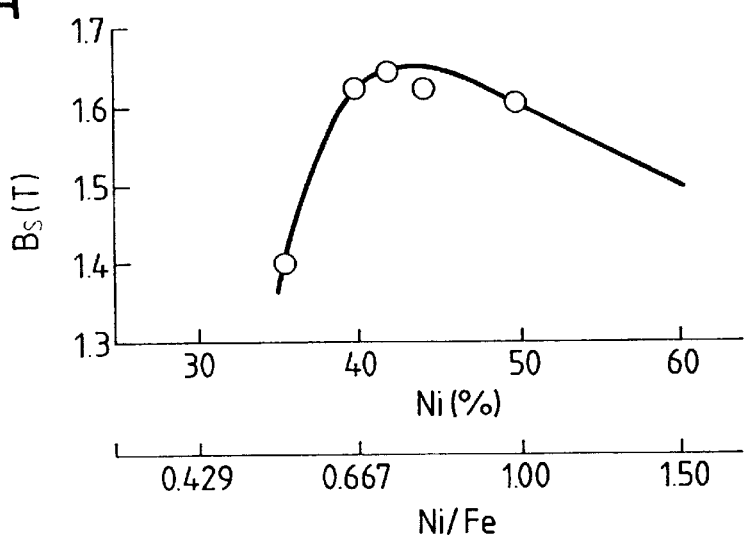
FIG. 16A is a graph showing the relationships between content of Ni or (Ni/Fe) ratio and $B_S$.
Figure 16B:
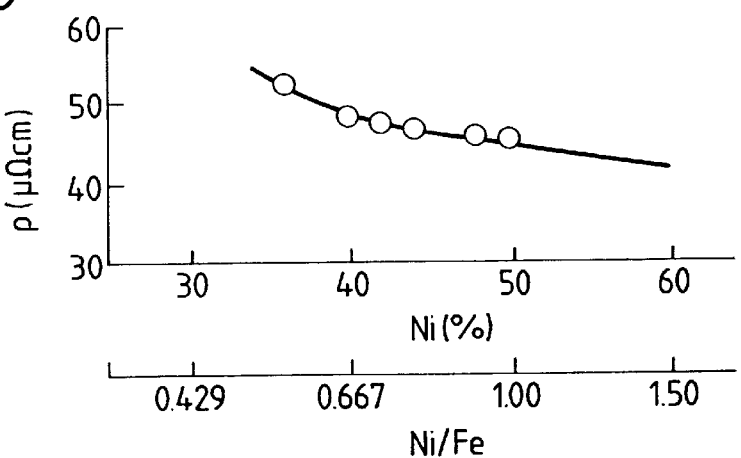
FIG. 16B is a graph showing the relationships between content of Ni or (Ni/Fe) ratio and $\rho$.
Figure 16C:
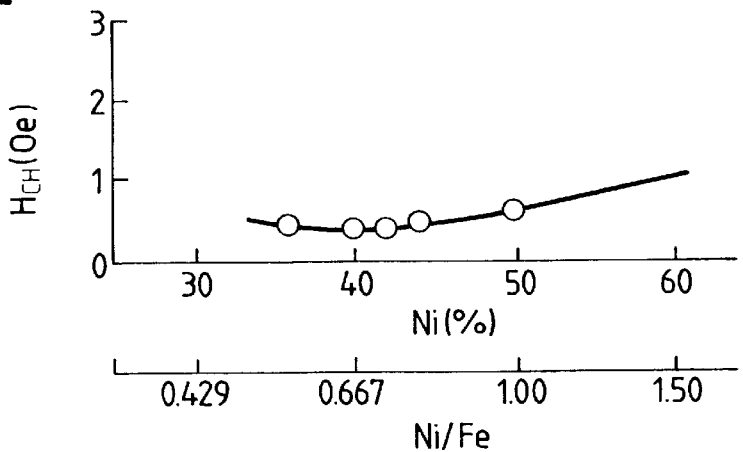
FIG. 16C is a graph showing the relationships between content of Ni or (Ni/Fe) ratio and $H_{CH}$.

FIGS. 16A, 16B and 16C are graphs showing the relationships between a component of magnetic film, magnetic characteristics and resistivity ($\rho$) when metallic ion concentrations, that is, amounts of $Ni^{++}$ and $Fe^{++}$, in a plating bath are varied.

$Ni^{++}$ is added using $NiCl_2.6H_2O$, $Fe^{++}$ is added using $FeSO_4.7H_2O$, and a common stress release agent and a surface active agent are added. Plating is performed under a condition of pH of 3.0 and plating current density of 15 mA/cm$^2$. The film thickness is 3.0 $\mu$m.

It can be understood that when the content of Ni in the film is within the range of 38 to 60 wt %, the saturation magnetic flux density ($B_S$) is larger than 1.5 T and the resistivity ($\rho$) is larger than 40 $\mu\Omega$·cm, that is, the film has outstanding characteristics in that the saturation magnetic flux density ($B_S$) is 1.5 times as large and the resistivity ($\rho$) is twice as large as those of the well known 80Ni—Fe permalloy film.

Further, the magnetic coercive force in the hard axis direction ($H_{CH}$) is smaller than 1 Oe, similar to 80Ni—Fe permalloy. The varying trends of saturation magnetic flux density ($B_S$) and resistivity ($\rho$) are nearly the same as those of the bulk material, but the decreasing rates as the Ni content increases are smaller than those of the bulk material. The reason is that the film has a very small crystal grain size of 40 to 80 Å compared with that of the bulk material.

Such characteristics are not largely varied when the pH is varied within the range of 2.5 to 3.5, and the plating current density is varied within the range of 5 to 30 mA/cm$^2$. When the plating bath temperature is varied within the range of 25 to 35° C., the content of Ni is slightly increased as the temperature is increased, but the characteristics themselves are not affected.

The magnetic film of the present embodiment is suitable for an upper magnetic core of an inductive head having a lower magnetic core using an Fe—Ni series alloy containing Ni of 70 to 80 wt %, but the film may be used both for the upper and the lower magnetic cores.

Especially, as shown in FIGS. 16A, 16B and 16C, $B_S$ shows the highest value of 1.6 T at Ni of 40 to 50 wt %, and it is preferable to combine with a film having an (Ni/Fe) ratio of 0.667 to 1.00. Incidentally, the (Ni/Fe) ratio of a film having Ni of 38 to 60 wt % is 0.613 to 1.50.

Figure 17A:
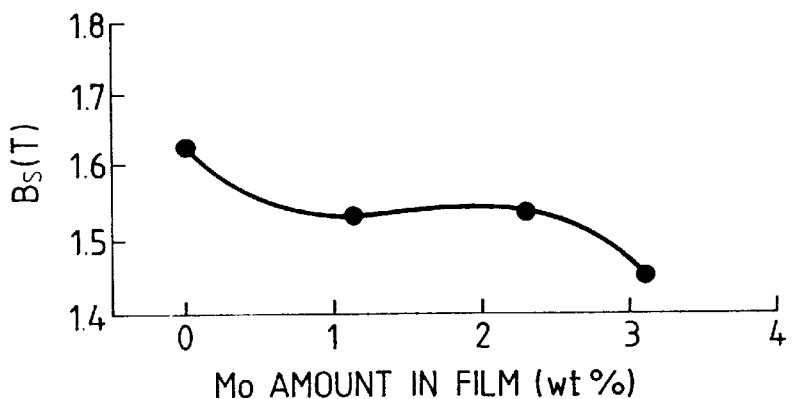
FIG. 17A is a graph showing the relationship between content of Mo and $B_S$.
Figure 17B:
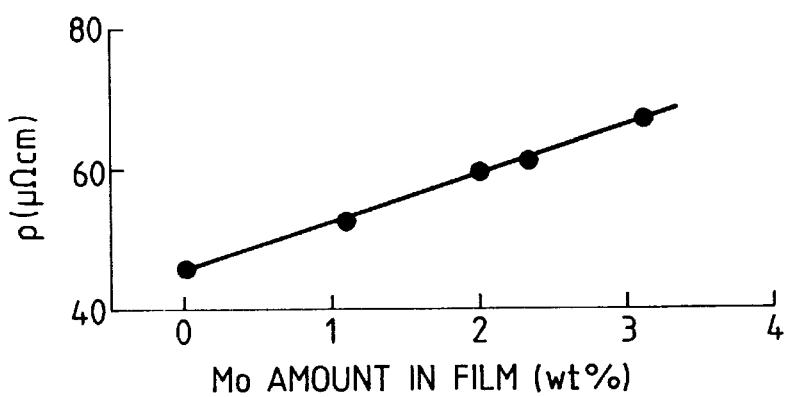
FIG. 17B is a graph showing the relationship between content of Mo and $\rho$.
Figure 17C:
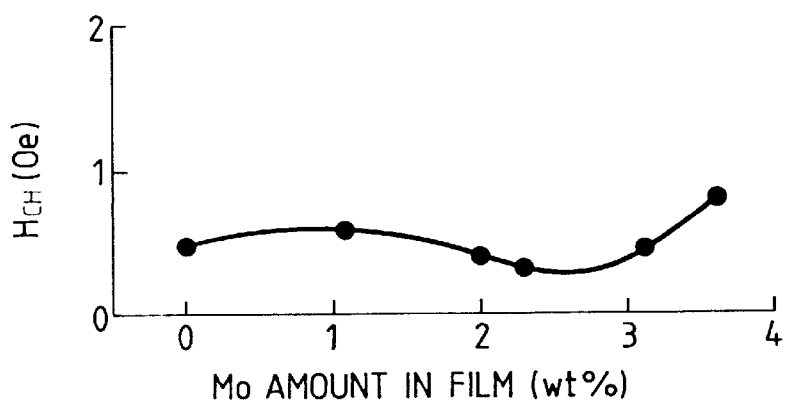
FIG. 17C is a graph showing the relationship between content of Mo and $H_{CH}$.

FIGS. 17A, 17B and 17C show test results on the magnetic characteristics and resistivity ($\rho$) of a magnetic film containing Mo in a (Ni 44 wt %-Fe) series alloy.

That is, the figure shows the magnetic characteristics and resistivity ($\rho$) of a magnetic film formed by adding Mo as an element to the increase resistivity ($\rho$) to a plating bath containing $N^{++}$ of 16.7 g/l and Fe of 2.2 g/l. The Mo is added using $Na_2MoO_4.4H_2O$ by 5 g/l at a maximum.

It can be understood that resistivity ($\rho$) of the magnetic film is increased in proportion to the amount of added Mo. For example, the resistivity ($\rho$) of the magnetic film having Mo of 2 wt % shows above 60 $\mu\Omega$·cm, which is about three times as large as that of the 80Ni—Fe permalloy film.

In this case, the saturation magnetic flux density ($B_S$) is decreased by only 5% and nearly 1.50 T, which is 1.5 times as high as that of the 80Ni—Fe permalloy film.

However, it is undesirable to add an amount of Mo exceeding 3 wt % (Mo of 5 g/l on the base of $Na_2MoO_4.4H_2O$) since the magnetic coercive force in the hard axis direction ($H_{CH}$) becomes above 1 Oe and the saturation magnetic flux density ($B_S$) becomes below 1.5 T.

Adding Cr, instead of Mo, has been studied, and the results are nearly the same as in the case of adding Mo. The magnetic film of this example may be used in the same way as in the previous examples.

Figure 18A:
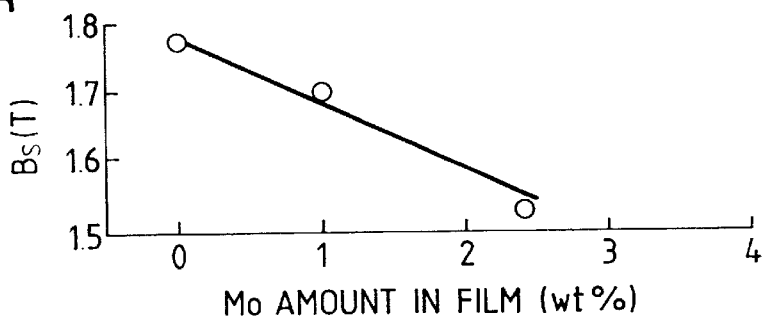
FIG. 18A is a graph showing the relationship between content of Mo and $B_S$.
Figure 18B:
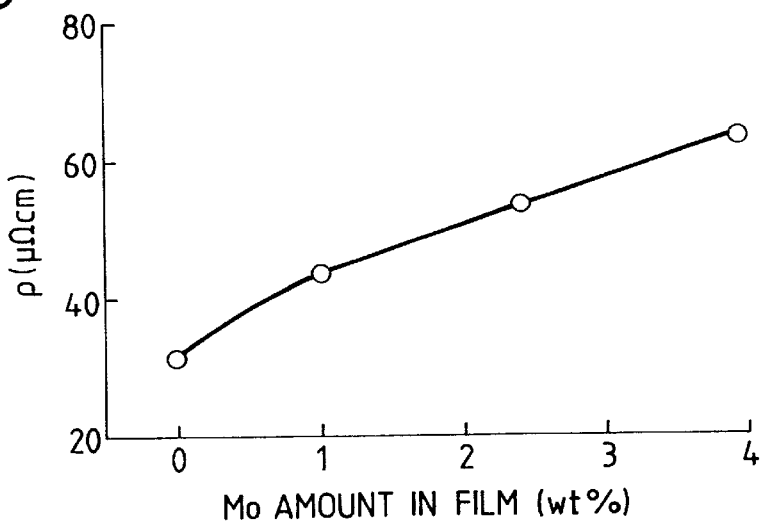
FIG. 18B is a graph showing the relationship between content of Mo and $\rho$.
Figure 18C:
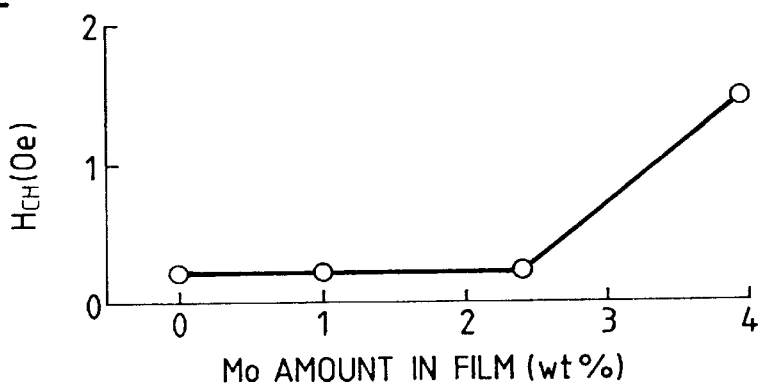
FIG. 18C is a graph showing the relationship between content of Mo and $H_{CH}$.

FIGS. 18A, 18B and 18C show test results on an (Ni 44 wt %-Fe)—Co 15 wt %-Mo magnetic film to which Co and Mo are added at one time in order to further increase the saturation magnetic flux density ($B_S$) and the resistivity ($\rho$) without degrading the magnetic characteristics of the magnetic film.

The Co is added using $CoSO_4.7H_2O$, and the Mo is added using $Na_2MoO_4.4H_2O$, in the same way as discussed with reference to FIGS. 17A–17C. The examples shown represent a case where the amount of Co added is a constant of 13 wt % (100 g/l on the base of $CoSO_4.7H_2O$) and, on the other hand, the amount of Mo added is varied up to 4 wt %.

As a result, by adding Co of 13 wt %, the saturation magnetic flux density ($B_S$) of the magnetic film is increased by 10% and becomes 1.78 T. However, the resistivity ($\rho$) is decreased by 30% and is 35 $\mu\Omega$·cm. By adding Mo, the resistivity ($\rho$) is recovered. By adding Mo of 2.5 wt %, the resistivity ($\rho$) is increased by nearly 20% on the contrary and becomes 55 $\mu\Omega$·cm.

In this case, the saturation magnetic flux density ($B_S$) is 1.55 T, which is a slightly higher value than the film without Co. Further, since the addition of Co increases the anisotropy of a film, the magnetic characteristic of the film is stabilized.

The magnetic film of this example may be used in the same way as in the previous examples.

Figure 19:
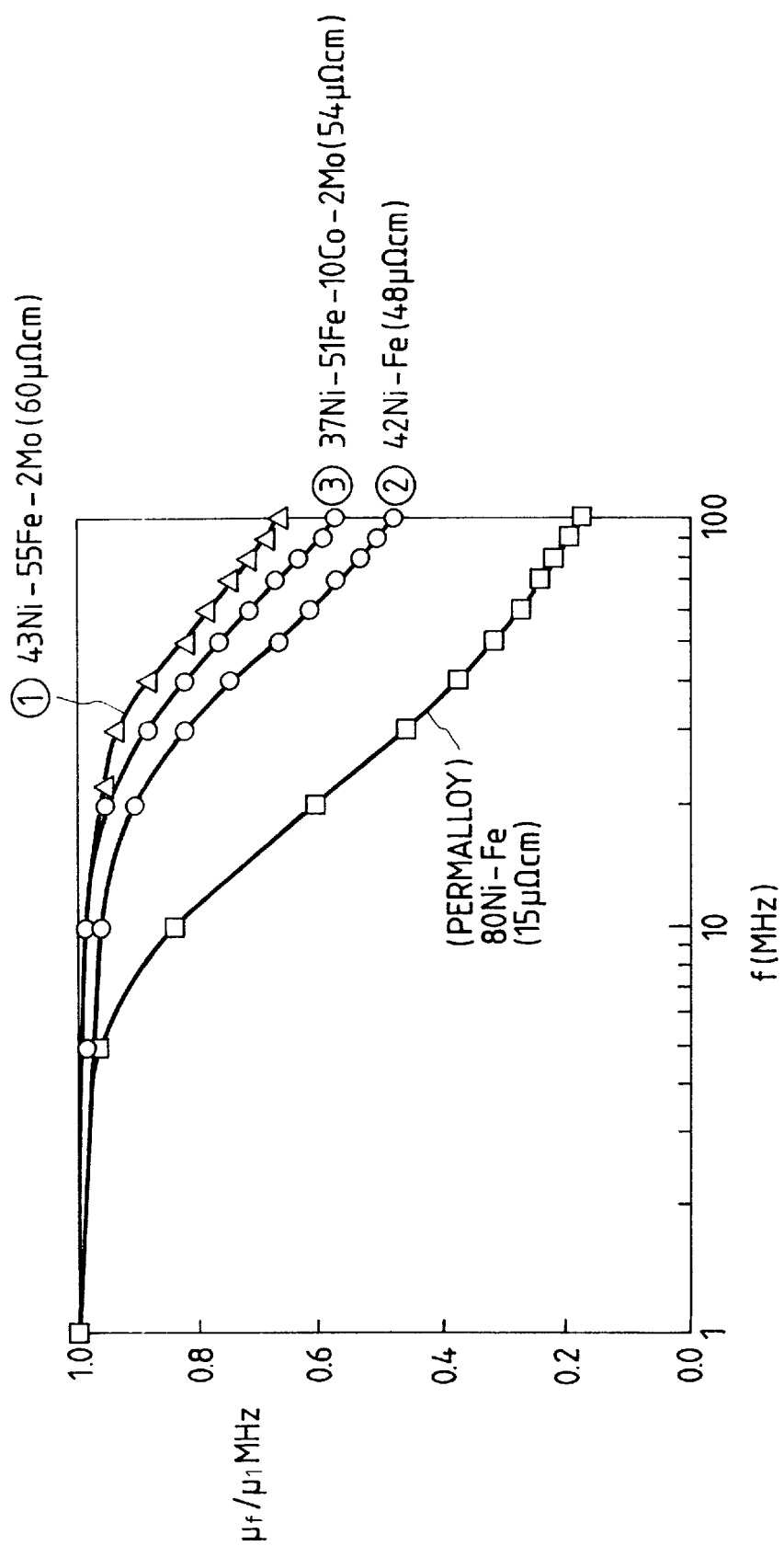
FIG. 19 is a graph showing the relationship between frequency and $(\mu f/\mu_1 \text{MHz})$.

FIG. 19 shows the permeability ($\mu$) of the typical magnetic films fabricated through the manufacturing methods described with reference to FIGS. 16A–16C, 17A–17C and 18A–18C. In the figure, the permeability is normalized with the value $\mu$ at a frequency of 1 MHz. For the purpose of comparison, the permeability ($\mu$) of the 80Ni—Fe permalloy film is also measured. The thicknesses of all films are 3 $\mu$m.

For the films of this example having a resistivity of 48 to 60 $\mu\Omega$·cm, the frequency (f) where the permeability ($\mu$) decreases by 25% (that is, 75% of initial permeability) is up to the range of 40 MHz to 70 MHz. This range is 3 to 5 times as wide as the frequency of 15 MHz for the permalloy. It can be understood that the frequency characteristics of the films of the present invention represent a distinct improvement.

Figure 20:
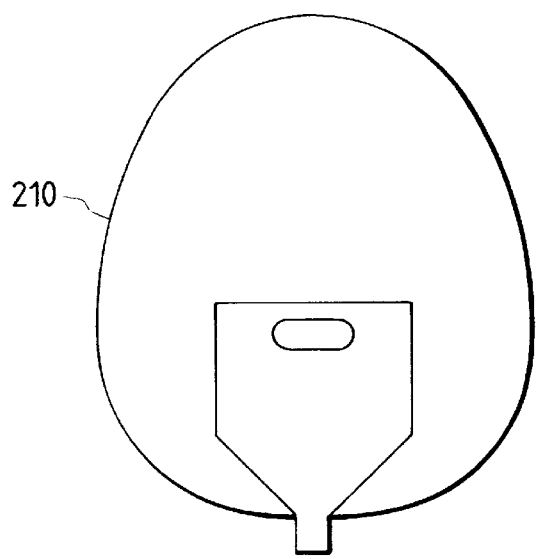
FIG. 20 is a plan view showing a thin film magnetic head.
Figure 21:
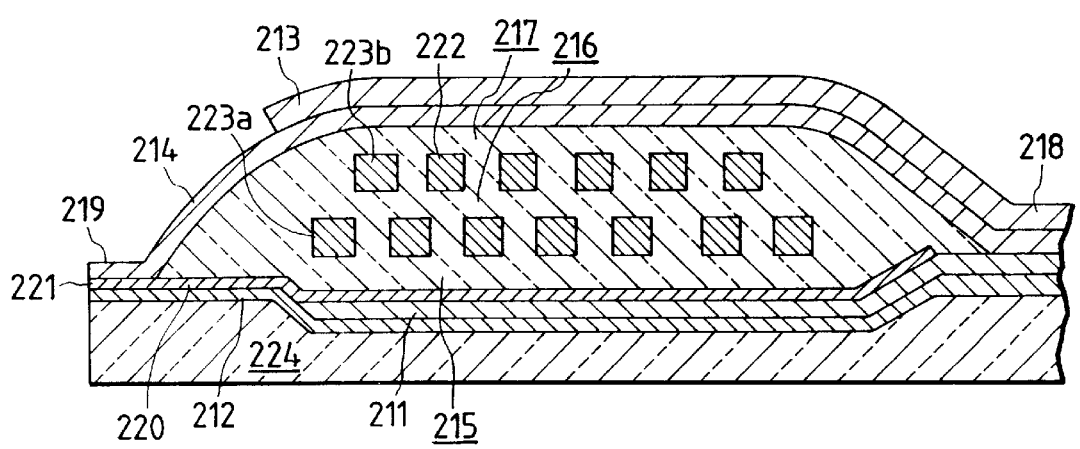
FIG. 21 is a cross-sectional view showing a thin film magnetic head.

FIG. 20 and FIG. 21 are cross-sectional views showing an inductive head having a two stage winding coil using the magnetic films according to the present invention for the upper and lower magnetic films in the embodiment of FIG. 1.

As shown in the figure, the thin film magnetic head 210 involves a lower portion and an upper portion magnetic film formed of two films 212 and 214 made of a magnetic material, for example, permalloy. The films 212 and 214 are deposited in two stages containing shaping films 221 and 213, respectively.

These films 212 and 214 are separated by insulating films 215, 216 and 217, except for a back portion region 218 where the films are physically in contact and a top end region 219 where the films are separated by a thin film 220 of a non-magnetic material to form a magnetic gap 221.

There is provided a flat conductive coil 222 in the space between the films 212 and 214 of a magnetic material. The coil 222 has two inter-layer multi-windings 223a to 223n deposited in an elliptical pattern between the films 215, 216 and 217 of insulating material.

The top end portion of the transducer gap 221 is even with an air bearing surface (ABS) formed on a non-magnetic substrate attached to the above mentioned films.

The transducer gap 221 reacts with a rotating magnetic recording medium (not shown), such as a rotating magnetic disk, in an air bearing relation. When the disk is rotated, the head flies on the air bearing surface (ABS) very near the recording surface of the disk.

The thin film magnetic head is fabricated by depositing a magnetic film 212 and a shaping film 211 on a substrate 224 using a proper mask in order to form a thin deposited film in the top region 219 of a magnetic pole chip. Then, a non-magnetic film 220 is formed on the films 211 and 212 except for the back gap region 218.

Then, a first insulating film 215 is deposited onto the film 220 except for the magnetic gap 221. A continuous and flat conductive first film of elliptical swirl-shaped winding 223a to 223n is deposited on the insulating film 215 through, for example, electroplating.

An insulating film 216 is deposited on the first film of the coil; a second film winding of the coil is deposited; and then, on the coil an insulating film 217 is deposited. Then, as described above, the magnetic film 214 is deposited on the insulated coil except for the back portion gap region 218 which physically contacts the magnetic film 212.

The top 219 of the magnetic pole chip has a pre-selected nearly constant width W. The width W is equal to or slightly narrower than the width of a track on the corresponding rotatable magnetic medium.

The selected width W of the top end of the magnetic pole chip is obtained by cutting the top end of the magnetic pole chip, and the step to cut the top end of the magnetic pole chip is performed before the step to deposit the shaping film 213 for the second magnetic film 214. By changing the process in such a manner, the top of the magnetic pole chip can be cut with a very much higher accuracy than a conventional process.

After depositing the magnetic film 214 and before depositing the shaping film 213, the thin film head assembly is covered with a photo-resist mask 230. Then, a window 232 is formed on the photo-resist mask in either of the sides of the top end region of the magnetic pole chip of the head.

The masked head is subjected to an ion milling process. During the process, the portion of head not covered by the mask is milled to be shaped to have a desired width as shown in FIG. 5.

The ion milling process affects the surface to be worked in the same manner as a normal condition, and accordingly a structure not covered with the mask is also milled together with the photo-resist mask. Therefore, the milled material produced from the head is re-deposited onto the remaining portion of the mask and onto the head structure which has been milled before.

For this reason, ion milling is performed in two stages. In the first step, the un-masked structure is milled up to the substrate 224 through the magnetic film 14, the non-magnetic gap film 220 and the magnetic film 212. In order to completely remove the material, it is preferable that the first step is performed until the substrate 224 is slightly milled.

The second step of the ion milling process is performed to remove all the re-deposited materials, and is performed in a large angle inclining state in which the surface inclines 75 to 80 degree to the vertical direction. In a preferable embodiment of an ion milling step, a permalloy magnetic material is milled with an etching rate of about 550 Å per minute by electric power of about 2 watt per cubic centimeter. Then the photo-resist is removed, a shaping magnetic film is deposited, and thus a thin film magnetic head is completed.

The photo-resist mask is milled during ion milling, and the thickness of the photo-resist on the head becomes thinner than the thickness of the photo-resist on the magnetic pole chip region depending on the shape of the magnetic film 214.

The thin film magnetic head fabricated according to the present invention is of a yoke structure having a transducer magnetic gap in one end and a back gap region in the other end, and the yoke structure, having a conductive coil for energizing a magnetic yoke attached between the magnetic gap and the back gap region of the yoke structure, is formed with two films made of a magnetic material.

A disk storage system constructed using the thin film magnetic head fabricated according to the present invention will be described. The example of the disk storage system according to the present invention comprises a magnetic disk having an outer diameter of approximately 3.5 inches, a spindle for rotating the disk, a positioning mechanism for a magnetic head and a housing.

The magnetic head is an inductive head, and the track width is 5.0 $\mu$m. The upper and the lower magnetic films of the head are formed with (Ni 44 wt %-Fe)-2 wt % Mo alloy thin films having a saturation magnetic flux density of 1.3 T, a resistivity ($\rho$) of 60 $\mu\Omega$·cm, a relative permeability $\mu$ of 1000, a film thickness d of 3 $\mu$m, and a gap length of 0.4 $\mu$m.

An equivalent effect may be obtained using the following material for the magnetic pole, that is, a similar Ni—Fe series alloy having a saturation magnetic flux density of 1.6 T, a Fe—Co—Ni/Al$_2$O$_3$/Fe—Co—Ni multi-layer film, a thin film of Ni—Fe containing ZrO$_2$, Y$_2$O$_3$, HfO$_2$, Al$_2$O$_3$ or SiO$_2$ having a grain size of 2 nm to 3 nm.

In the case of mixing an oxide in the magnetic film, the grain size is preferably 0.5 nm to 5 nm. This is because, when the oxide grain size is within the above range, only the resistivity can be increased without degrading the saturation magnetic flux density or the soft magnetic characteristic so much.

By mixing an oxide as described above in the Fe—Ni alloy thin film, the resistivity can be increased up to approximately 60 $\mu\Omega$·cm, and the relative permeability shows as a good soft magnetic characteristic of nearly 1000.

On the other hand, in a case where a NiFe thin film without an oxide is employed for a recording magnetic pole of a head, the high frequency characteristic can be improved by decreasing the relative magnetic permeability up to 500 or less. However, it is necessary to set the recording magnetomotive force of a head to a value larger than 0.5 T.

A recording film of a magnetic disk is formed of CoCrTa (adding amount of Cr is 16 at %) having a magnetic coercive force in the recording bit direction of 2100 Oe and a magnetic coercive force orientation ratio of 1.2. The product Br.δ of the residual magnetic flux density and the film thickness of the recording medium is 300 gauss·μm.

By employing the recording medium, it is possible to improve the linear recording density characteristic and to substantially decrease the medium noise in a high linear recording density range. When the medium magnetic coercive force is lower than 200 Oe, the bit error rate is decreased.

The rotating speed of the spindle during recording and reproducing is set to 4491 rpm, and the amount by which the head floats at the outermost periphery of the data recording region on the magnetic disk at that time is 0.05 μm.

The linear recording density on each track is set so becomes equal from the inner most periphery to the outermost periphery of the data recording region, and the recording frequency at the outermost periphery is set to 67.5 MHz.

In the disk storage system in this embodiment, the linear recording density of data on each of the tracks is set to 144 kBPI (kiro Bit Per Inch), the track density is set to 5 kTPI (kiro Track Per Inch), and accordingly areal density is 720 mega-bit per square inch.

In this example, four magnetic disks are used, the format capacity of the system is 2.8 giga-bytes, and the transfer rate is 15 mega-bytes per second.

Although in this example, 8/9 conversion is used for data recording, a system having the same performance as this example may be constructed even when the conventional 1–7 method is used for data recording. However, in that case, the recording frequency becomes 45 MHz.

The specification of the disk storage system constructed according to this example is shown in Table 3.

TABLE 3

Specification of a 3.5 inch Type Apparatus

| | |
|---|---|
| Memory Capacity | 2.8 GB |
| Number of Disks | 4 |
| Number of Data Surfaces | 8 |
| Number of Heads | 8 |
| Number of Tracks/Disk Surface | 4427 |
| Maximum Linear Recording Density | 144 kBPI |
| Track Density | 5 kTPI |
| Rotating Speed | 4491 RPM |
| Recording Frequency | 67.5 MHz |
| Transfer Rate (to/from Media) | 15 MB/sec |

Description will be made on the results obtained from a disk storage system combining a magnetic head according to the present invention with magnetic disks having disk a diameter of 2.5 inches, 1.8 inches and 1.3 inches.

The magnetic head and the magnetic disks used in this example are the same as those used in the previous example, the linear recording density of data on each of tracks is set to 144 kBPI, and the track density is set to 5 kTPI. The rotating speed of the spindle is set so that the transfer rate becomes 15 MB/sec for each of the disks.

Further, as described in the previous example, a system having the same performance may be constructed even when the conventional 1–7 method is used for data recording. However, in that case, the recording frequency becomes 45 MHz.

TABLE 4

Specification of a 2.5 inch Type Apparatus

| | |
|---|---|
| Memory Capacity | 1.8 GB |
| Number of Disks | 4 |
| Number of Data Surfaces | 8 |
| Number of Heads | 8 |
| Number of Tracks/Disk Surface | 2951 |
| Maximum Linear Recording Density | 144 kBPI |
| Track Density | 5 kTPI |
| Rotating Speed | 6376 RPM |
| Recording Frequency | 67.5 MHz |
| Transfer Rate (to/from Media) | 15 MB/sec |

TABLE 5

Specification of a 1.8 inch Type Apparatus

| | |
|---|---|
| Memory Capacity | 1.4 GB |
| Number of Disks | 4 |
| Number of Data Surfaces | 8 |
| Number of Heads | 8 |
| Number of Tracks/Disk Surface | 2213 |
| Maximum Linear Recording Density | 144 kBPI |
| Track Density | 5 kTPI |
| Rotating Speed | 8982 RPM |
| Recording Frequency | 67.5 MHz |
| Transfer Rate (to/from Media) | 15 MB/sec |

TABLE 6

Specification of a 1.3 inch Type Apparatus

| | |
|---|---|
| Memory Capacity | 0.9 GB |
| Number of Disks | 4 |
| Number of Data Surfaces | 8 |
| Number of Heads | 8 |
| Number of Tracks/Disk Surface | 1475 |
| Maximum Linear Recording Density | 144 kBPI |
| Track Density | 5 kTPI |
| Rotating Speed | 13473 RPM |
| Recording Frequency | 67.5 MHz |
| Transfer Rate (to/from Media) | 15 MB/sec |

Two kinds of inductive heads using magnetic poles having different resistivity p, film thickness d and relative permeability μ were fabricated, and the frequency dependence of the recording magnetic field intensity for each of the heads was measured using an electron beam tomography method.

The magnetic pole material, the magnetic pole thickness d, the resistivity ρ and the relative permeability μ in a low frequency band below 1 MHz for each of the prototype heads are shown in Table 7.

The head A comprises a magnetic pole formed of a Ni—Fe alloy single film having the composition described with reference to FIGS. 1–15 and film thickness of 3 μm. The head B comprises a magnetic pole formed by laminating Fe—Co—Ni—Mo films of 2.2 μm film thickness through an $Al_2O_3$ intermediate film of 0.1 μm film thickness, in the same manner as described with reference to FIGS. 18A–18C. Thereby, the total thickness of the magnetic pole film of this head is 4.5 μm.

Here, in the multi-layer film of Fe—Co—Ni—Mo/$Al_2O_3$/Fe—Co—Ni—Mo, when the thickness of the single layer of the Fe—Co—Ni—Mo film exceeds 2.7 μm, the attenuation of the magnetic field intensity at a recording frequency of 45 MHz becomes above 10% to cause write blurring or fluctuation in an over-write film, which is undesirable. In this example, the thickness of the Fe—Co—Ni—Mo film is set to 2.2 μm.

The head C comprises a lower magnetic film of a magnetic pole which is a Co—Ta—Zr amorphous single layer film having a film thickness of 3 μm and a resistivity of 90 μΩ·cm.

TABLE 7

Specification of Prototype Thin Film Magnetic Head

| Head | Material of Magnetic Pole | d (μ) | ρ (μÅ·cm) | μ |
|------|---------------------------|-------|-----------|------|
| A | NiFe | 3.0 | 16 | 1000 |
| B | FeCoNiMo multi-layer film | 2.2 | 16 | 1000 |
| C | CoTaZr | 3.0 | 90 | 1000 |

Note
d: thickness of magnetic pole
ρ: resistivity
μ: relative permeability

The head efficiencies η are calculated from the measured results of the normalized frequency dependence of the recording magnetic field intensity. For the head A having a magnetic pole of a Ni—Fe single layer film, the recording magnetic field intensity begins to decrease near a point exceeding 10 MHz and the intensity at 100 MHz is attenuated to lower than 60% of the intensity in the low frequency band.

On the other hand, although the head B uses Fe—Co—Ni—Mn films having a magnetic permeability and a resistivity equivalent to those of the NiFe film used in the head A, the eddy current loss is substantially decreased, since the films are of a multi-layer structure through an $Al_2O_3$ insulating film.

In the case of this head, the attenuation of the magnetic field intensity at 100 MHz is nearly 20% and the frequency characteristic is improved. In the case of the head C, the attenuation of the magnetic field intensity at 100 MHz is nearly 0% and the frequency characteristic is outstanding.

In another example of the present invention, upper and lower magnetic films are formed by the following method.

There is fabricated an inductive head having upper and lower magnetic cores which are electroplated through a mask in a plating bath containing $Ni^{++}$ of 16.7 g/l, $Fe^{++}$ of 2.4 g/l, and a common stress-release agent and a surface-active agent under a condition of a pH of 3.0 and a plating current density of 15 mA.

The track width is 4.0 μm, and the gap length is 0.4 μm. The composition of this magnetic film is 42.4 Ni—Fe (weight %), and as to the magnetic characteristics, saturation magnetic flux density ($B_S$) is 1.64 T, the magnetic coercive force in the hard axis direction ($H_{CH}$) is 0.5 Oe, and resistivity (ρ) is 48.1 μΩ·cm.

Figure 22:
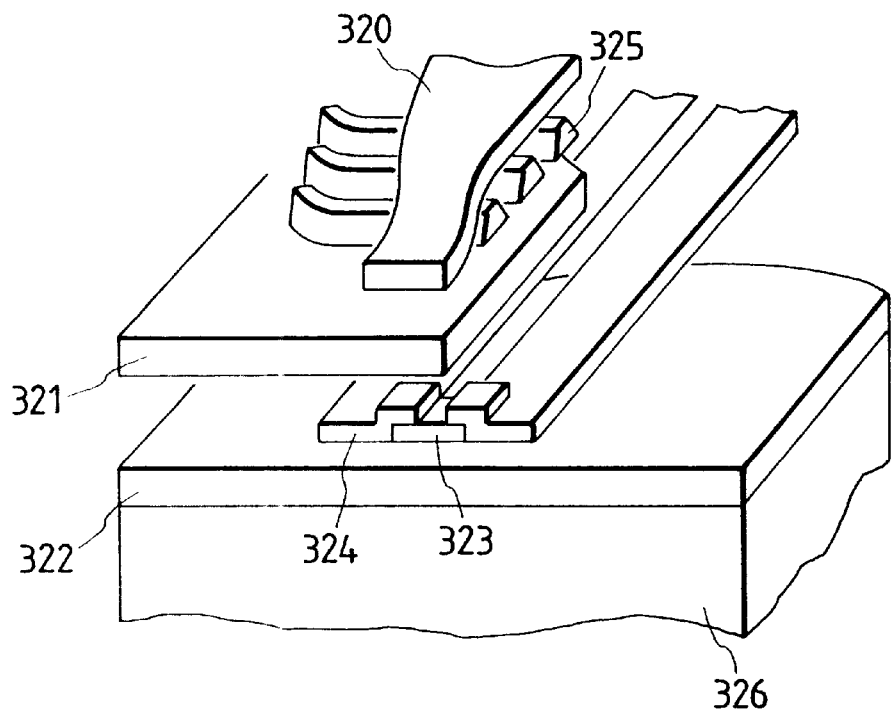
FIG. 22 is a perspective view showing a dual element head.
Figure 23:
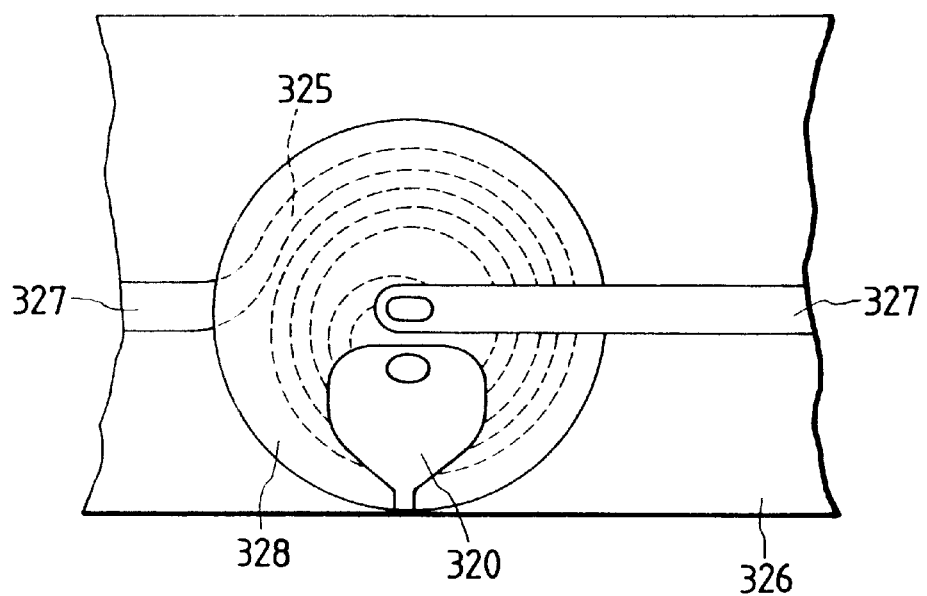
FIG. 23 is a plan view showing an inductive head.

FIG. 22 is a perspective view showing a dual element head, and FIG. 23 is a plan view of the head. The write head comprises an upper magnetic core 320, a lower magnetic core 321 which also serves as an upper shield film, and a coil 325. The read head comprises a magnetoresistive element 323, an electrode 324 for conducting sense current to the magnetoresistive element 323 and a lower shield film 322. The write and read heads are formed on a slider 326.

This inductive head is mounted on the disk storage system described with reference to FIGS. 1–15 to evaluate the recording performance. The medium used has an outer diameter of 3.5 inches and a magnetic coercive force of 2500 Oe.

The performance (over-write characteristic) of the recording head according to the present invention, when evaluated under such a construction, shows an outstanding characteristic which is approximately −50 dB at a high frequency band above 40 MHz.

A disk storage system in a further example of this invention employs a dual element head, as shown in FIG. 22, which uses an inductive head for recording and a magnetoresistive element for reproducing. The upper magnetic film of the recording magnetic pole of the inductive head is formed as described above.

And, for the other of the upper shield film 81, also serving as a recording magnetic pole, a multi-layer film of Fe—Co—Ni/$Al_2O_3$/Fe—Co—Ni having a single layer thickness of Fe—Co—Ni film of 2.2 μm is used. The thickness of the $Al_2O_3$ intermediate film is set to 0.1 μm, and the track width of the recording pole is set to 3 μm.

A Ni—Fe alloy film having thickness of 1 μm is used for the lower shield film 82. A Ni—Fe alloy film having a thickness of 15 nm is used for the magnetoresistive element 86, which is driven utilizing a soft film bias method.

Instead of the magnetoresistive element 86 using a Ni—Fe alloy film, it is also possible to use a spin valve type element composed of an Ni—Fe film, a Cu film, a Co film and an anti-ferromagnetic film of Ni—O series, Fe—Mn series or Cr—Mn series; an alloy type giant-magnetoresistive element of Co—Ag, Co—Au, NiFe—Ag, Co—Cu, Fe—Ag or the like; or a multi-layer type giant-magnetoresistive element of Co/Cr, Fe/Cr, Co/Cu or NiFe/Cu series.

The disk storage system constructed according to this example can attain the same specification as shown in Table 2.

What is claimed is:

1. A thin film magnetic head comprising:
   a first magnetic core;
   a second magnetic core formed on said first magnetic core;
   a coil disposed between said first magnetic core and second magnetic core; and
   a non-magnetic insulator body for separating said first magnetic core, second magnetic core and coil with respect to each other;
   wherein at least one of said first magnetic core and said second magnetic core includes an electroplated thin film with an average crystal grain size smaller than 500 Å; and
   wherein said electroplated thin film is made of Ni—Fe alloy of which Ni is 38 to 60 wt % and Fe is 40 to 62 wt %.

2. A thin film magnetic head according to claim 1, wherein said Ni—Fe alloy contains Co as an additional element and an amount of said Co is less than 15 wt % in the total weight.

3. A thin film magnetic head according to claim 2, wherein said Ni—Fe alloy contains another additional element which is at least one element selected from the group of Mo, Cr and Pd, and a total amount of said Mo, Cr and Pd is less than 3 wt % in the total weight.

4. A thin film magnetic head according to claim 1, further comprising:
   a substrate;
   a lower shield formed on the substrate;
   a pair of electrodes formed on said lower shield;
   a magnetoresistive element disposed between said pair of electrodes; and
   an upper shield formed on said magnetoresistive element;

wherein the thin film magnetic head is formed on said upper shield.

5. An assembled construction of a magnetic head comprising:

a magnetic head including reading and writing elements;

a magnetic head slider in which said magnetic head is disposed;

a gimbal system for supporting said magnetic head slider including a flexible body having one end attached to said magnetic head slider and a rigid beam connected to said flexible body;

said writing element comprises:

a first magnetic core;

a second magnetic core;

wherein at least one of said first magnetic core and said second magnetic core is made of an electroplated thin film with an average crystal grain size smaller than 500 Å; and wherein said electroplated thin film is made of Ni—Fe alloy of which Ni is 38 to 60 wt % and Fe is 40 to 62 wt %.

* * * * *